US011385770B1

(12) United States Patent
Raidu et al.

(10) Patent No.: US 11,385,770 B1
(45) Date of Patent: Jul. 12, 2022

(54) USER INTERFACES FOR SINGLE-HANDED MOBILE DEVICE CONTROL

(71) Applicant: QUALCOMM Incorporated, San Diego, CA (US)

(72) Inventors: Venu Madhav Raidu, Hyderabad (IN); Raja Shekhar Reddy Annam, Hyderabad (IN); Sriram Emarose, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/302,028

(22) Filed: Apr. 21, 2021

(51) Int. Cl.
| | |
|---|---|
| G06F 3/0482 | (2013.01) |
| H04M 1/72472 | (2021.01) |
| G06F 3/0488 | (2022.01) |
| G06F 3/04817 | (2022.01) |
| H04M 1/72448 | (2021.01) |
| G06F 3/04883 | (2022.01) |

(Continued)

(52) U.S. Cl.
CPC .......... *G06F 3/0482* (2013.01); *G06F 3/0484* (2013.01); *G06F 3/0488* (2013.01); *G06F 3/04817* (2013.01); *G06F 3/04883* (2013.01); *G06F 3/167* (2013.01); *H04M 1/72448* (2021.01); *H04M 1/72472* (2021.01); *G06F 2203/0338* (2013.01)

(58) Field of Classification Search
CPC .............. G06F 3/0488; G06F 3/04883; G06F 3/04842; G06F 2203/04803; G06F 3/04845; G06F 9/451; G06F 3/048; G06F 3/0484; G06F 3/0482; G06F 3/04817; G06F 21/32; G06F 2203/0338; H04M 1/72469; H04M 1/72472; H04M 1/72448; H04M 1/724; G06K 9/00006
See application file for complete search history.

(56) References Cited

U.S. PATENT DOCUMENTS

| | | |
|---|---|---|
| 6,795,569 B1 | 9/2004 | Setlak |
| 7,853,055 B2 | 12/2010 | Machida |

(Continued)

FOREIGN PATENT DOCUMENTS

| | | |
|---|---|---|
| WO | 2016191968 A1 | 12/2016 |

OTHER PUBLICATIONS

Anonymous, Methods to operate large-screen smart phone with single hand, IP.com, IPCOM000248892D, Jan. 20, 2017) (Year: 2017).*

*Primary Examiner* — Nicholas Ulrich
(74) *Attorney, Agent, or Firm* — Weaver Austin Villeneuve & Sampson LLP—Qual

(57) ABSTRACT

This disclosure provides systems, methods and apparatus, including computer programs encoded on computer storage media, for presenting, while an apparatus is in a first apparatus orientation, a plurality of icons in a first configuration on a display of the apparatus. In some aspects, the first configuration may correspond to a first icon arrangement. Some disclosed methods involve presenting, associated with a custom event, the plurality of icons in a second configuration on the display while the apparatus remains substantially in the first apparatus orientation. The second configuration may correspond to a second icon arrangement wherein a first position of at least one icon in the first configuration is different from a second position of the at least one icon in the second configuration.

27 Claims, 19 Drawing Sheets

(51) Int. Cl.
*G06F 3/0484* (2022.01)
*G06F 3/16* (2006.01)

(56) References Cited

U.S. PATENT DOCUMENTS

| | | | |
|---|---|---|---|
| 8,335,356 B2 | 12/2012 | Schmitt | |
| 8,358,815 B2 | 1/2013 | Benkley et al. | |
| 8,482,381 B2 | 7/2013 | Chatterjee et al. | |
| 9,104,898 B2 | 8/2015 | Case | |
| 9,335,847 B2* | 5/2016 | An | G06F 3/04886 |
| 9,390,308 B2 | 7/2016 | Mankowski et al. | |
| 9,953,205 B1 | 4/2018 | Rasmussen et al. | |
| 10,438,040 B2 | 10/2019 | Strohmann et al. | |
| 10,515,255 B2 | 12/2019 | Strohmann et al. | |
| 10,552,658 B2 | 2/2020 | Strohmann et al. | |
| 2005/0180620 A1 | 8/2005 | Takiguchi et al. | |
| 2008/0166028 A1 | 7/2008 | Turek et al. | |
| 2008/0247615 A1 | 10/2008 | Mainguet | |
| 2010/0066697 A1 | 3/2010 | Jacomet et al. | |
| 2010/0067747 A1 | 3/2010 | Perruchot et al. | |
| 2010/0113952 A1 | 5/2010 | Raguin et al. | |
| 2012/0237091 A1 | 9/2012 | Nakamura | |
| 2013/0100021 A1 | 4/2013 | Larsen et al. | |
| 2014/0219521 A1 | 8/2014 | Schmitt et al. | |
| 2014/0354597 A1 | 12/2014 | Kitchens, II et al. | |
| 2014/0359757 A1 | 12/2014 | Sezan et al. | |
| 2015/0003693 A1 | 1/2015 | Baca et al. | |
| 2015/0123931 A1 | 5/2015 | Kitchens et al. | |
| 2015/0126246 A1 | 5/2015 | Lombardi et al. | |
| 2015/0268733 A1* | 9/2015 | Govindapillai | G06F 1/1694 |
| | | | 715/863 |
| 2016/0070967 A1 | 3/2016 | Du et al. | |
| 2016/0179338 A1* | 6/2016 | Miller | G06F 3/04883 |
| | | | 345/174 |
| 2016/0196041 A1* | 7/2016 | Lavoie | G06F 3/04883 |
| | | | 715/822 |
| 2016/0239704 A1 | 8/2016 | Yamada et al. | |
| 2016/0246396 A1 | 8/2016 | Dickinson et al. | |
| 2016/0253544 A1 | 9/2016 | Weber et al. | |
| 2016/0328144 A1* | 11/2016 | Agrawal | G06F 3/04847 |
| 2016/0342781 A1 | 11/2016 | Jeon | |
| 2017/0231534 A1 | 8/2017 | Agassy et al. | |
| 2017/0255338 A1 | 9/2017 | Medina et al. | |
| 2017/0315720 A1* | 11/2017 | Sun | G06F 3/04883 |
| 2017/0323130 A1 | 11/2017 | Dickinson et al. | |
| 2017/0372122 A1 | 12/2017 | Shim et al. | |
| 2018/0018495 A1 | 1/2018 | Hung et al. | |
| 2018/0101711 A1 | 4/2018 | D'Souza et al. | |
| 2019/0026120 A1* | 1/2019 | Bostick | G06F 3/04886 |
| 2020/0249824 A1* | 8/2020 | Zhang | G06F 3/04845 |
| 2020/0302146 A1* | 9/2020 | Bjerre | G06F 3/0488 |

\* cited by examiner

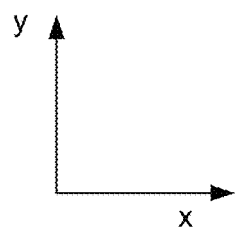
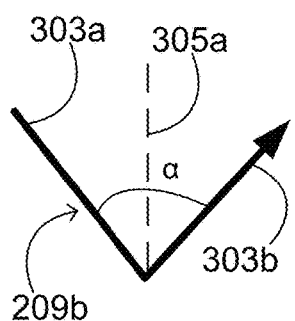
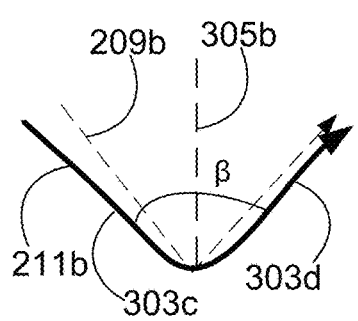
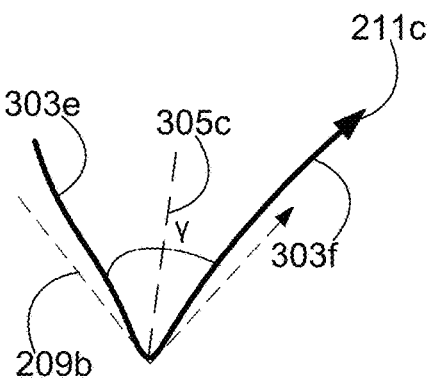
*Figure 3A*  *Figure 3B*  *Figure 3C*
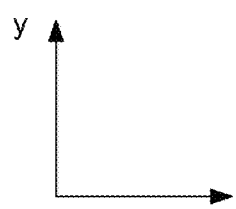
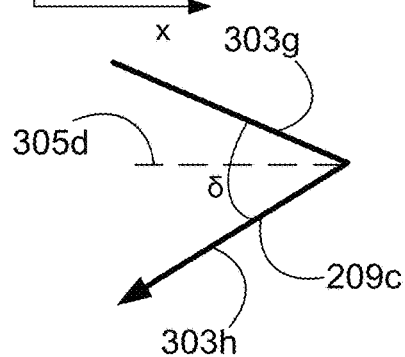
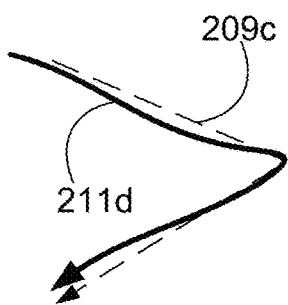
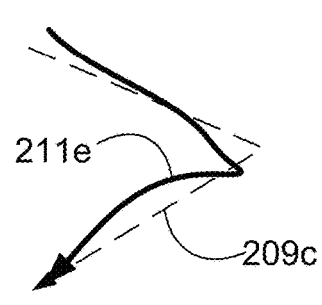
*Figure 3D*  *Figure 3E*  *Figure 3F*

USER INTERFACES FOR SINGLE-HANDED MOBILE DEVICE CONTROL

TECHNICAL FIELD

This disclosure relates generally to mobile devices and related methods, including but not limited to user interfaces for interacting with mobile devices.

DESCRIPTION OF THE RELATED TECHNOLOGY

Mobile devices such as cellular telephones have become nearly ubiquitous features of modern life. Although some existing user interfaces for controlling mobile devices provide acceptable performance under some conditions, improved methods and devices may be desirable.

SUMMARY

The systems, methods and devices of the disclosure each have several innovative aspects, no single one of which is solely responsible for the desirable attributes disclosed herein.

One innovative aspect of the subject matter described in this disclosure may be implemented in an apparatus. According to some examples, the apparatus may be integrated into a mobile device. The apparatus may include a display and a control system configured for communication with (such as electrically or wirelessly coupled to) the display. In some examples, the apparatus may include a touch sensor system, a gesture sensor system, a fingerprint sensor system or a microphone system. In some examples, the control system may include a memory, whereas in other examples the control system may be configured for communication with a memory that is not part of the control system. The control system may include one or more general purpose single- or multi-chip processors, digital signal processors (DSPs), application specific integrated circuits (ASICs), field programmable gate arrays (FPGAs) or other programmable logic devices, discrete gates or transistor logic, discrete hardware components, or combinations thereof.

According to some examples, the display may be configured to present, while the apparatus is in a first apparatus orientation, a plurality of icons in a first configuration on the display. The first configuration may correspond to a first icon arrangement. In some such examples, the display may be configured to present, associated with a custom event, the plurality of icons in a second configuration on the display while the apparatus remains substantially in the first apparatus orientation. The second configuration may correspond to a second icon arrangement. In some instances, a first position of at least one icon in the first configuration may be different from a second position of the at least one icon in the second configuration.

In some examples, the at least one icon may be displayed in a first half of the display in the first configuration. In some such examples, the at least one icon may be displayed in a second half of the display in the second configuration.

According to some examples, a row of icons including the at least one icon may be displayed in the first half of the display in the first configuration. In some such examples, the row of icons may be displayed in the second half of the display in the second configuration. In some such examples, the row of icons may be displayed proximate a first side of the display in the first configuration. In some such examples, the row of icons may be displayed proximate a second side of the display in the second configuration. The second side may be a side opposite the first side.

Other innovative aspects of the subject matter described in this disclosure may be implemented in a method. In some examples, the method may involve presenting, while an apparatus is in a first apparatus orientation, a plurality of icons in a first configuration on a display of the apparatus. The first configuration may correspond to a first icon arrangement. In some such examples, the method may involve presenting, associated with a custom event, the plurality of icons in a second configuration on the display while the apparatus remains substantially in the first apparatus orientation. The second configuration may correspond to a second icon arrangement. In some instances, a first position of at least one icon in the first configuration may be different from a second position of the at least one icon in the second configuration.

In some examples, the at least one icon may be displayed in a first half of the display in the first configuration. In some such examples, the at least one icon may be displayed in a second half of the display in the second configuration.

According to some examples, a row of icons including the at least one icon may be displayed in the first half of the display in the first configuration. In some such examples, the row of icons may be displayed in the second half of the display in the second configuration. In some such examples, the row of icons may be displayed proximate a first side of the display in the first configuration. In some such examples, the row of icons may be displayed proximate a second side of the display in the second configuration. The second side may be a side opposite the first side.

Some or all of the operations, functions or methods described herein may be performed by one or more devices according to instructions (such as software) stored on one or more non-transitory media. Such non-transitory media may include memory devices such as those described herein, including but not limited to random access memory (RAM) devices, read-only memory (ROM) devices, etc. Accordingly, some innovative aspects of the subject matter described in this disclosure can be implemented in one or more non-transitory media having software stored thereon. For example, the software may include instructions for controlling one or more devices to perform a method.

In some examples, the method may involve presenting, while an apparatus is in a first apparatus orientation, a plurality of icons in a first configuration on a display of the apparatus. The first configuration may correspond to a first icon arrangement. In some such examples, the method may involve presenting, associated with a custom event, the plurality of icons in a second configuration on the display while the apparatus remains substantially in the first apparatus orientation. The second configuration may correspond to a second icon arrangement. In some instances, a first position of at least one icon in the first configuration may be different from a second position of the at least one icon in the second configuration.

In some examples, the at least one icon may be displayed in a first half of the display in the first configuration. In some such examples, the at least one icon may be displayed in a second half of the display in the second configuration.

According to some examples, a row of icons including the at least one icon may be displayed in the first half of the display in the first configuration. In some such examples, the row of icons may be displayed in the second half of the display in the second configuration. In some such examples, the row of icons may be displayed proximate a first side of the display in the first configuration. In some such examples, the row of icons may be displayed proximate a second side of the display in the second configuration. The second side may be a side opposite the first side.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

FIG. 3A presents another example of a custom event touch pattern.

FIGS. 3B and 3C present examples of received touch patterns that may be received from a touch sensor system.

FIG. 3D presents another example of a custom event touch pattern.

FIGS. 3E and 3F present additional examples of received touch patterns that may be received from the touch sensor system.

Like reference numbers and designations in the various drawings indicate like elements.

DETAILED DESCRIPTION

Figure 1:
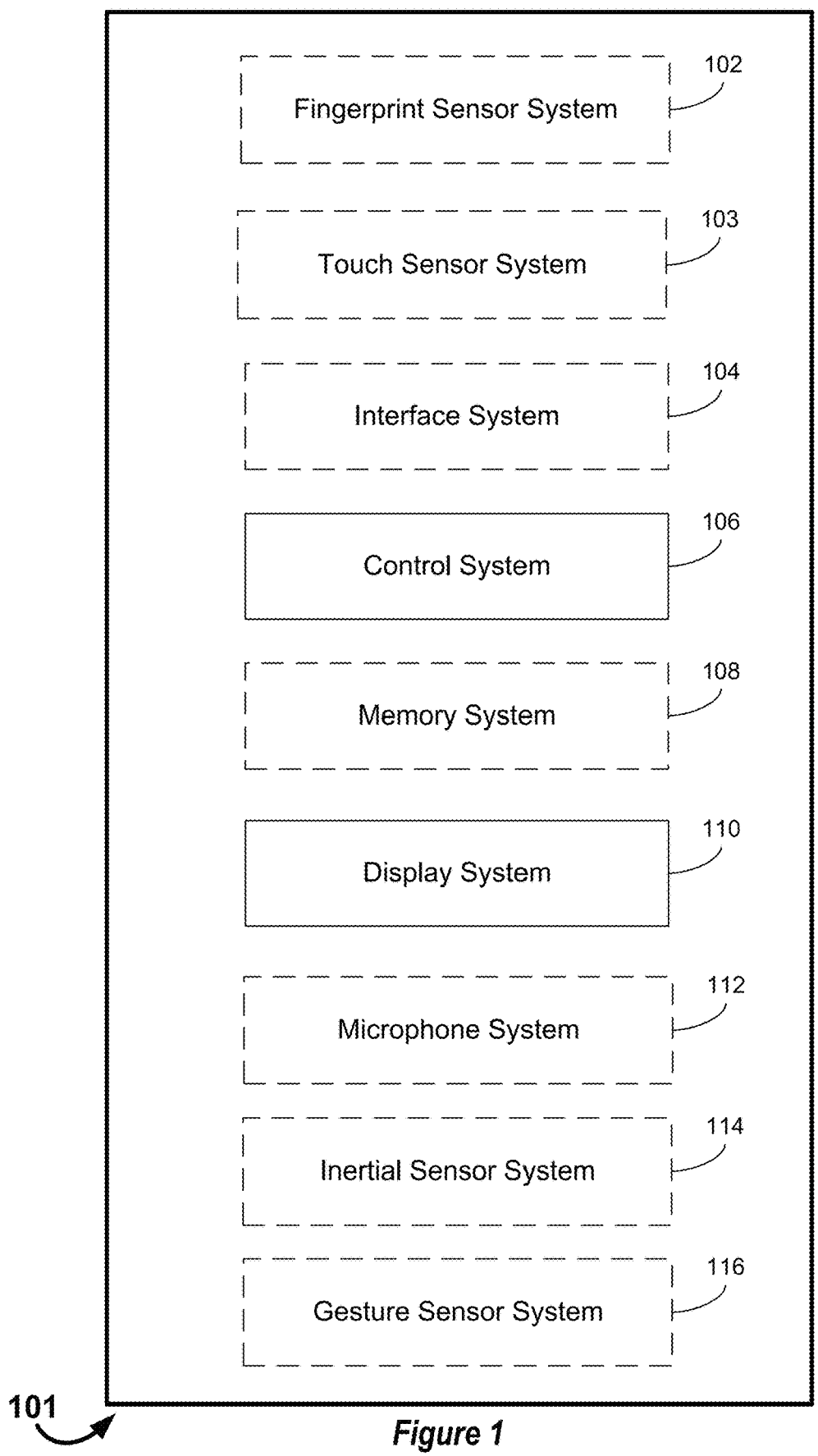
FIG. 1 is a block diagram that presents example components of an apparatus.

The following description is directed to certain implementations for the purposes of describing the innovative aspects of this disclosure. However, a person having ordinary skill in the art will readily recognize that the teachings herein may be applied in a multitude of different ways. The described implementations may be implemented in any device, apparatus, or system that includes a biometric system as disclosed herein. In addition, it is contemplated that the described implementations may be included in or associated with a variety of electronic devices such as, but not limited to: mobile telephones, multimedia Internet enabled cellular telephones, mobile television receivers, wireless devices, smartphones, smart cards, wearable devices such as bracelets, armbands, wristbands, rings, headbands, patches, etc., Bluetooth® devices, personal data assistants (PDAs), wireless electronic mail receivers, hand-held or portable computers, netbooks, notebooks, smartbooks, tablets, printers, copiers, scanners, facsimile devices, global positioning system (GPS) receivers/navigators, cameras, digital media players (such as MP3 players), camcorders, game consoles, wrist watches, clocks, calculators, television monitors, flat panel displays, electronic reading devices (such as e-readers), mobile health devices, computer monitors, auto displays (including odometer and speedometer displays, etc.), cockpit controls or displays, camera view displays (such as the display of a rear view camera in a vehicle), electronic photographs, electronic billboards or signs, projectors, architectural structures, microwaves, refrigerators, stereo systems, cassette recorders or players, DVD players, CD players, VCRs, radios, portable memory chips, washers, dryers, washer/dryers, parking meters, packaging (such as in electromechanical systems (EMS) applications including microelectromechanical systems (MEMS) applications, as well as non-EMS applications), aesthetic structures (such as display of images on a piece of jewelry or clothing) and a variety of EMS devices. The teachings herein also may be used in applications such as, but not limited to, electronic switching devices, radio frequency filters, sensors, accelerometers, gyroscopes, motion-sensing devices, magnetometers, inertial components for consumer electronics, parts of consumer electronics products, steering wheels or other automobile parts, varactors, liquid crystal devices, electrophoretic devices, drive schemes, manufacturing processes and electronic test equipment. Thus, the teachings are not intended to be limited to the implementations depicted solely in the Figures, but instead have wide applicability as will be readily apparent to one having ordinary skill in the art.

A common method for controlling devices involves presenting icons in icon positions on a display of the device. Each of the icons may correspond to a software application. A control system of the device may be configured to initialize a selected software application in association with (for example, in response to) receiving, from a touch sensor system, a touch indication in an icon position.

It is common for icons to occupy much of the active display area of a mobile device. The screen sizes of mobile devices, such as cellular telephones, have been increasing in recent years. If a mobile device is being held in a user's hand, it can be very difficult to interact with all displayed icons with the same hand. For example, if a user is holding the lower half of a cellular telephone with one hand, it may be difficult or impossible for the user to reach icons displayed in the upper half of the device's display screen with the same hand.

Some disclosed methods may involve presenting, while an apparatus is in a first apparatus orientation, a plurality of icons in a first configuration on a display of the apparatus. The first configuration may correspond to a first icon arrangement. Some disclosed methods involve presenting, associated with a custom event (such as a particular touch pattern or gesture pattern), the plurality of icons in a second configuration on the display while the apparatus remains substantially in the first apparatus orientation. The second configuration may correspond to a second icon arrangement where a first position of at least one icon in the first configuration is different from a second position of the at least one icon in the second configuration. For example, in the first icon arrangement a row of icons may be presented at the top of the display, whereas in the second icon arrangement the row of icons may be presented at the bottom of the display.

Particular implementations of the subject matter described in this disclosure may be implemented to realize one or more of the following potential advantages. Some disclosed methods allow a user to reach all icons displayed on a mobile device display with the same hand that is holding the mobile device. In some such examples, the mobile device may allow the user to rearrange displayed icons in response to user input corresponding to a custom event (such as a particular touch pattern, gesture pattern, voice command, etc.). Some disclosed implementations may allow a user to reach all icons with the hand that is holding the mobile device without decreasing the area of the display on which the icons are presented. Alternatively, or additionally, in some examples a user may select a desired icon using a displayed cursor that is controlled according to input from a sensor system, such as a touch sensor system or a fingerprint sensor system. Allowing a user to select icons using the hand that is holding a mobile device allows the user to use the other hand for another purpose.

FIG. 1 is a block diagram that presents example components of an apparatus. In this example, the apparatus 101 includes a control system 106 and a display system 110. Some implementations may include an interface system 104, a fingerprint sensor system 102, a touch sensor system 103 or a memory system 108.

According to some examples, the fingerprint sensor system 102 may be, or may include, an ultrasonic fingerprint sensor. Alternatively, or additionally, in some implementations the fingerprint sensor system 102 may be, or may include, an optical fingerprint sensor. In some examples, an ultrasonic version of the fingerprint sensor system 102 may include an ultrasonic receiver and a separate ultrasonic transmitter. In some such examples, the ultrasonic transmitter may include an ultrasonic plane-wave generator. However, various examples of ultrasonic fingerprint sensors are disclosed herein, some of which may include a separate ultrasonic transmitter and some of which may not. For example, in some implementations, the fingerprint sensor system 102 may include a piezoelectric receiver layer, such as a layer of polyvinylidene fluoride PVDF polymer or a layer of polyvinylidene fluoride-trifluoroethylene (PVDF-TrFE) copolymer. In some implementations, a separate piezoelectric layer may serve as the ultrasonic transmitter. In some implementations, a single piezoelectric layer may serve as both a transmitter and a receiver. The fingerprint sensor system 102 may, in some examples, include an array of ultrasonic transducer elements, such as an array of piezoelectric micromachined ultrasonic transducers (PMUTs), an array of capacitive micromachined ultrasonic transducers (CMUTs), etc. In some such examples, PMUT elements in a single-layer array of PMUTs or CMUT elements in a single-layer array of CMUTs may be used as ultrasonic transmitters as well as ultrasonic receivers.

Data received from the fingerprint sensor system 102 may sometimes be referred to herein as "fingerprint sensor data," "fingerprint image data," etc., although the data will generally be received from the fingerprint sensor system in the form of electrical signals. Accordingly, without additional processing such image data would not necessarily be perceivable by a human being as an image.

The touch sensor system 103 may be, or may include, a resistive touch sensor system, a surface capacitive touch sensor system, a projected capacitive touch sensor system, a surface acoustic wave touch sensor system, an infrared touch sensor system, or any other suitable type of touch sensor system. In some implementations, the area of the touch sensor system 103 may extend over most or all of a display portion of the display system 110.

The control system 106 may include one or more general purpose single- or multi-chip processors, digital signal processors (DSPs), application specific integrated circuits (ASICs), field programmable gate arrays (FPGAs) or other programmable logic devices, discrete gates or transistor logic, discrete hardware components, or combinations thereof. According to some examples, the control system 106 also may include one or more memory devices, such as one or more random access memory (RAM) devices, read-only memory (ROM) devices, etc. In this example, the control system 106 is configured for communication with, and for controlling, the display system 110. In implementations where the apparatus includes a fingerprint sensor system 102, the control system 106 is configured for communication with, and for controlling, the fingerprint sensor system 102. In implementations where the apparatus includes a touch sensor system 103, the control system 106 is configured for communication with, and for controlling, the touch sensor system 103. In implementations where the apparatus includes a memory system 108 that is separate from the control system 106, the control system 106 also may be configured for communication with the memory system 108. In implementations where the apparatus includes a microphone system 112, the control system 106 is configured for communication with, and for controlling, the microphone system 112. In implementations where the apparatus includes an inertial sensor system 114, the control system 106 is configured for communication with, and for controlling, the inertial sensor system 114. According to some examples, the control system 106 may include one or more dedicated components for controlling the fingerprint sensor system 102, the touch sensor system 103, the memory system 108, the display system 110, the microphone system 112 or the inertial sensor system 114. In some implementations, functionality of the control system 106 may be partitioned between one or more controllers or processors, such as between a dedicated sensor controller and an applications processor of a mobile device.

In some examples, the memory system 108 may include one or more memory devices, such as one or more RAM devices, ROM devices, etc. In some implementations, the memory system 108 may include one or more computer-readable media, storage media or storage media. Computer-readable media include both computer storage media and communication media including any medium that may be enabled to transfer a computer program from one place to another. Storage media may be any available media that may be accessed by a computer. In some examples, the memory system 108 may include one or more non-transitory media. By way of example, and not limitation, non-transitory media may include RAM, ROM, electrically erasable programmable read-only memory (EEPROM), compact disc ROM (CD-ROM) or other optical disk storage, magnetic disk storage or other magnetic storage devices, or any other medium that may be used to store desired program code in the form of instructions or data structures and that may be accessed by a computer.

Some implementations of the apparatus 101 may include an interface system 104. In some examples, the interface system 104 may include a wireless interface system. In some implementations, the interface system 104 may include a user interface system, one or more network interfaces, one or more interfaces between the control system 106 and the fingerprint sensor system 102, one or more interfaces between the control system 106 and the touch sensor system 103, one or more interfaces between the control system 106 and the memory system 108, one or more interfaces between the control system 106 and the display system 110, one or more interfaces between the control system 106 and the microphone system 112, one or more interfaces between the control system 106 and the inertial sensor system 114, one or more interfaces between the control system 106 and the gesture sensor system 116 or one or more interfaces between the control system 106 and one or more external device interfaces (such as ports or applications processors).

The interface system 104 may be configured to provide communication (which may include wired or wireless communication, electrical communication, radio communication, etc.) between components of the apparatus 101. In some such examples, the interface system 104 may be configured to provide communication between the control system 106 and the fingerprint sensor system 102. According to some such examples, the interface system 104 may couple at least a portion of the control system 106 to the fingerprint sensor system 102 and the interface system 104 may couple at least a portion of the control system 106 to the touch sensor system 103, such as via electrically conducting material (for example, via conductive metal wires or traces). According to some examples, the interface system 104 may be configured to provide communication between the apparatus 101 and other devices or human beings. In some such examples, the interface system 104 may include one or more user interfaces. The interface system 104 may, in some examples, include one or more network interfaces or one or more external device interfaces (such as one or more universal serial bus (USB) interfaces or a serial peripheral interface (SPI)).

In this example, the apparatus 101 includes a display system 110 that includes one or more displays. In some examples, the display system 110 may be, or may include, a light-emitting diode (LED) display, such as an organic light-emitting diode (OLED) display. In some such examples, the display system 110 may include layers, which may be referred to collectively as a "display stack."

In some implementations, the apparatus 101 may include a microphone system 112. The microphone system 112 may include one or more microphones.

According to some implementations, the apparatus 101 may include an inertial sensor system 114. The inertial sensor system 114 may include one or more types of inertial sensors, such as gyroscopes or accelerometers. The inertial sensor system 114 may be configured to provide inertial sensor data to the control system 106 indicating the orientation of the apparatus 101.

In some implementations, the apparatus 101 may include a gesture sensor system 116. The gesture sensor system 116 may be, or may include, an ultrasonic gesture sensor system, an optical gesture sensor system or any other suitable type of gesture sensor system. One example of a gesture sensor system 116 is described below with reference to FIG. 7.

The apparatus 101 may be used in a variety of different contexts, some examples of which are disclosed herein. For example, in some implementations a mobile device may include at least a portion of the apparatus 101. In some implementations, a wearable device may include at least a portion of the apparatus 101. The wearable device may, for example, be a bracelet, an armband, a wristband, a ring, a headband or a patch. In some implementations, the control system 106 may reside in more than one device. For example, a portion of the control system 106 may reside in a wearable device and another portion of the control system 106 may reside in another device, such as a mobile device (for example, a smartphone). The interface system 104 also may, in some such examples, reside in more than one device.

Figure 2A:
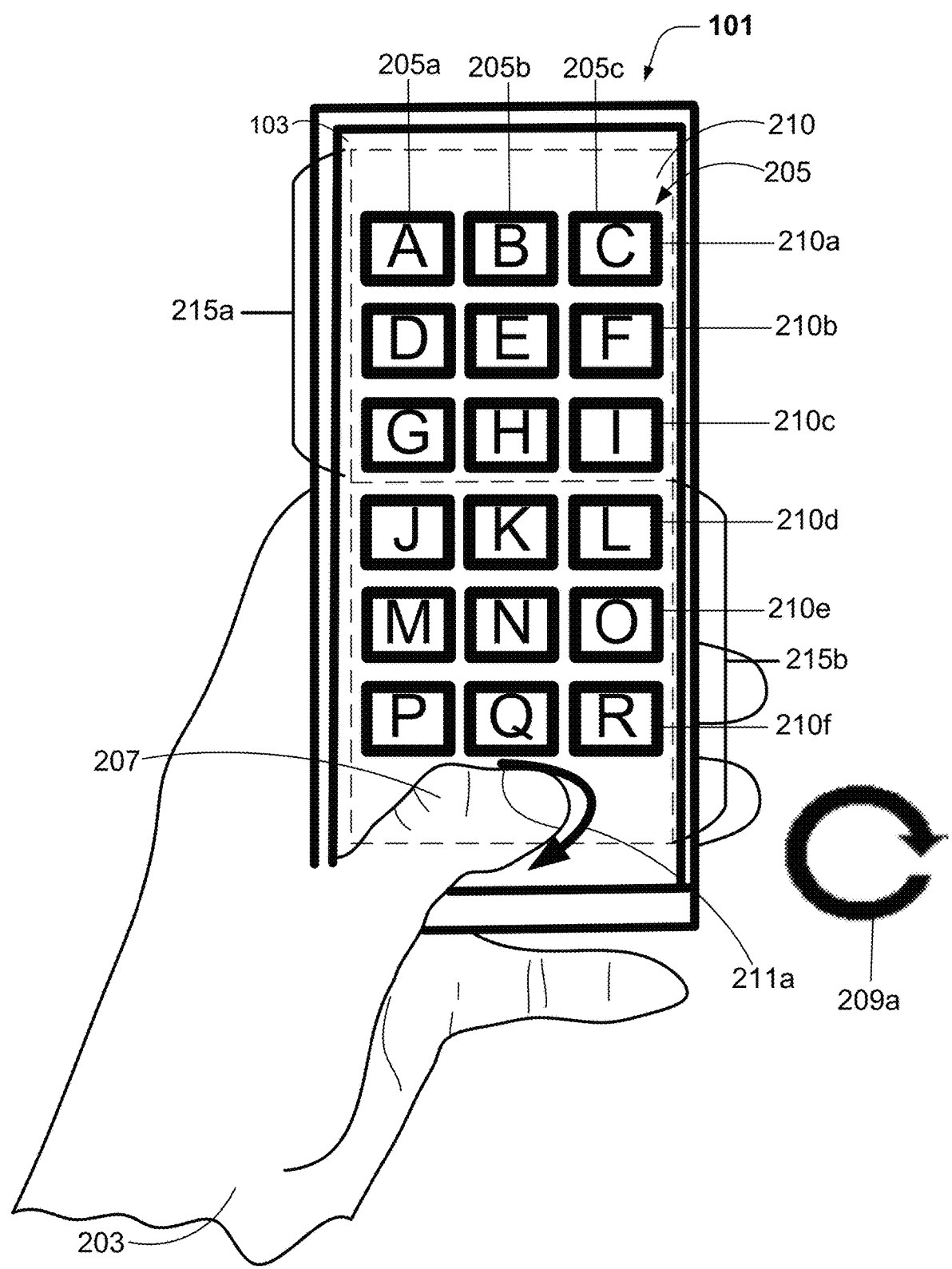
FIG. 2A presents an example of the apparatus of FIG. 1.

FIG. 2A presents an example of the apparatus of FIG. 1. As with other disclosed implementations, the scale, numbers, arrangements and types of the elements presented in FIG. 2A are merely presented for illustrative purposes. Other implementations of the apparatus 101 may have different numbers, arrangements or types of elements.

In this example, the apparatus 101 is mobile device, which in this instance is a cellular telephone. In this instance, the apparatus 101 is being held by the hand 203 of a user. According to this example, the display 210 is an instance of the display system 110 that is described with reference to FIG. 1. In this implementation, the apparatus 101 includes an instance of the touch sensor system 103 of FIG. 1 proximate the display 210, for example residing between the display 210 and a cover glass. In this example, the apparatus 101 includes instances of the control system 106 and the inertial sensor system 114 of FIG. 1, although these elements are not presented in FIG. 2A.

According to this example, icons 205 are being presented on the display 210. In this example, each of the icons 205 corresponds to a different software application or "app," as indicated by the letters A-R. In this instance, icons 205 corresponding to apps A-I are being presented in the upper half 215a of the display 210 in icon rows 210a, 210b and 210c. Similarly, icons 205 corresponding to apps J-R are being presented in the lower half 215b of the display 210 in icon rows 210d, 210e and 210f. This configuration of icons is one example of what may be referred to herein as an "icon arrangement."

In this example, the control system 106 of the apparatus 101 is configured to initialize a selected app in association with (such as in response to) receiving, from the touch sensor system 103, a touch indication in an icon position. Accordingly, in this example a user may select an app by touching the apparatus 101 in the area of a corresponding icon 205. For example, the user may select app A by touching the apparatus 101 in the area of the icon 205a. One may observe that it would be challenging for the user to reach the icons 205 that are being presented in the upper half 215a using a digit of the hand 203 while the hand 203 is holding the apparatus 101.

In the example presented in FIG. 2A, the user is moving the thumb 207 to provide an example of user input that will be referred to herein as a "custom event." The custom event may correspond to a single-handed operational mode. In some such examples, prior to the custom event, the single-handed operational mode may have been enabled according to user input. On such example is described below with reference to FIG. 4.

According to this example, the custom event is provided via touch sensor data received from the touch sensor system 103 indicating a received touch pattern 211a. According to some examples where the apparatus 101 includes a fingerprint sensor system 102, the received touch pattern 211a (or a received gesture pattern) may be received from the fingerprint sensor system 102. In this example, the custom event touch pattern 209a is a clockwise circular swipe, which the received touch pattern 211a approximates. The control system 106 may, for example, determine whether the received touch pattern 211a corresponds with a particular device operation by reference to a data structure that includes touch patterns and corresponding device operations. Various alternative examples of custom event touch patterns are described below with reference to FIGS. 3A-3F.

In some implementations, the apparatus 101 is configured to present, associated with a custom event, the icons 205 in a second configuration on the display 210. In some such examples, the apparatus 101 is configured to present the icons 205 in the second configuration on the display 210 while the apparatus 101 remains substantially in the same orientation. In other words, in some such examples the icons 205 are not presented in the second configuration in response to inertial sensor data from the inertial sensor system 114 indicating that the apparatus has been rotated or otherwise re-oriented. In some instances, the second configuration corresponds to a second icon arrangement in which a position of at least one icon has changed, relative to a previous icon arrangement.

Figure 2B:
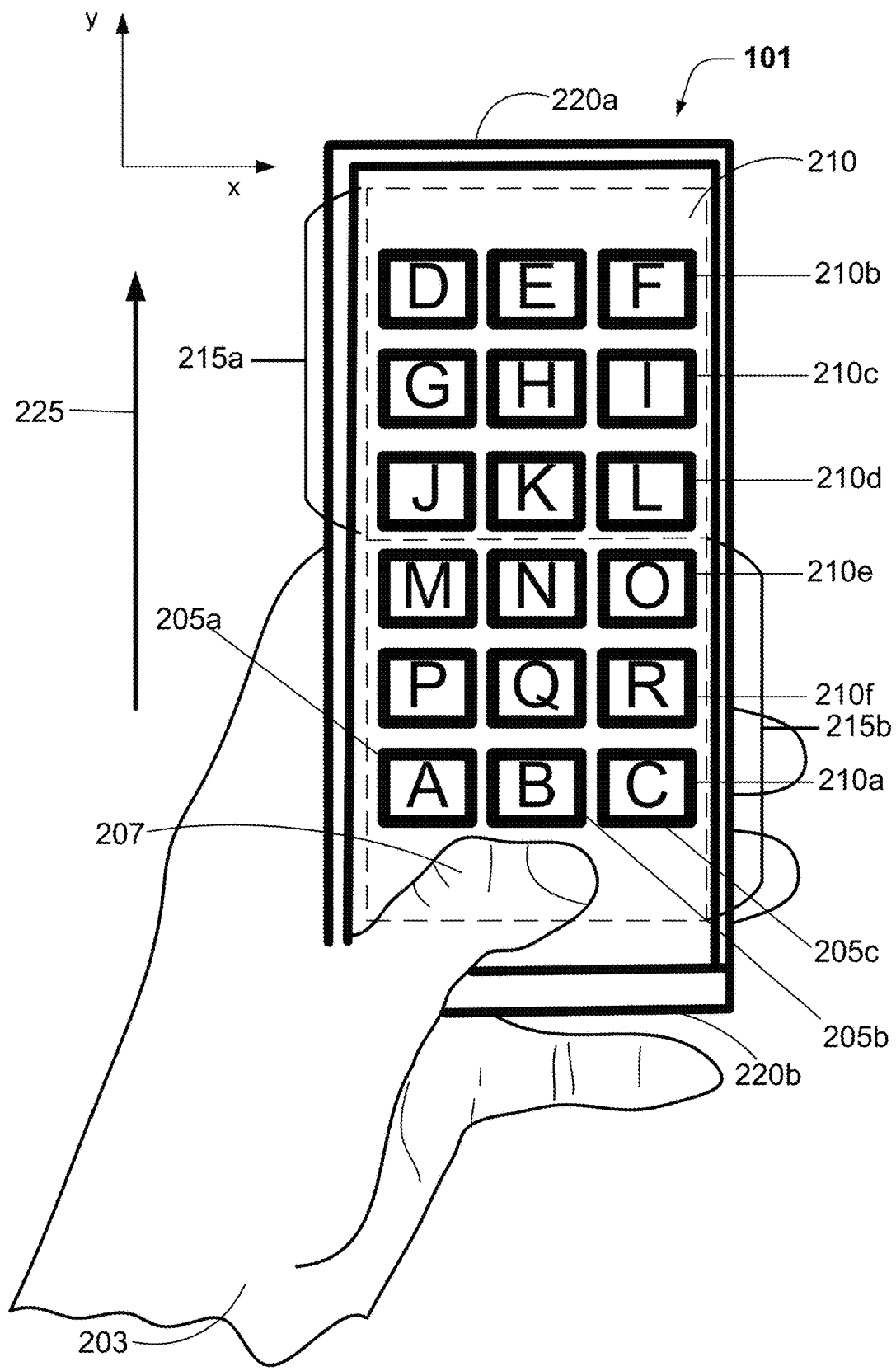
FIG. 2B presents an example of an icon arrangement associated with a custom event.

FIG. 2B presents an example of an icon arrangement associated with a custom event. According to this example, associated with the custom event, the display 210 is now presenting the icon row 210a in the lower half 215b of the display 210. At the time corresponding with FIG. 2B, the icon row 210a is now the closest row of icons to side 220b of the apparatus 101 and the closest row of icons to the thumb 207. Icon rows 210b-210f are now being presented one row closer to side 220a of the apparatus 101, as compared to the positions of icon rows 210b-210f that are presented in FIG. 2A. From the user's perspective, it may appear as though the icon rows 210b-210f have moved in the direction of the arrow 225. The user may perceive that the custom event has caused the icon row 210a to "wrap around" the apparatus 101 from the position of the icon row 210a presented in FIG. 2A to the position of the icon row 210a presented in FIG. 2B.

According to some examples, if the user provides additional user input corresponding to the custom event, the display 210 will present the icon row 210b as the closest row of icons to side 220b. In some such examples, icon rows 210a and 210c-210f will be presented one row closer to side 220a of the apparatus 101, as compared to the positions of icon rows 210a and 210c-210f that are presented in FIG. 2B. According to some such implementations, by repeatedly providing user input corresponding to a custom event, the user may perceive that the display 210 is scrolling through the icon rows 210a-210f.

According to some alternative examples, the custom event may cause two or more icon rows to be re-positioned, for example to cause two or more icon rows previously presented in the upper half 215a to be presented in the lower half 215b. In some alternative examples, the custom event may cause one or more individual icons 205 to be re-positioned, for example to cause one or more individual icons 205 previously presented in the upper half 215a to be presented in the lower half 215b.

In some instances, another type of custom event may cause the display 210 to position the icons 205 differently from what is described above with reference to FIGS. 2A and 2B. For example, one counter-clockwise circular custom event touch pattern or custom event gesture pattern may cause the positions of the icons 205 to revert from the icon positions presented in FIG. 2B to those presented in FIG. 2A. A second counter-clockwise circular custom event touch pattern or custom event gesture pattern may cause the icon row 210f to be presented between the icon row 210a and the side 220a, and for the icon rows 210a-210e to be presented one row closer to the side 220b.

In some examples, the apparatus 101 may include an instance of the gesture sensor system 116 that is described above with reference to FIG. 1. According to some such examples, the custom event may correspond to gesture sensor data received from a gesture sensor system indicating a custom event gesture pattern. In some implementations, the custom event gesture pattern may be the same as the custom event touch pattern, which in this example is a clockwise circular swipe. According to some such implementations, a user may provide user input corresponding to the custom even via either the custom event gesture pattern or the custom event touch pattern. However, in some implementations the custom event gesture pattern may not be the same as the custom event touch pattern. In some implementations, a user may be able to indicate a custom event via a custom event gesture pattern or a custom event touch pattern, but not both.

In some examples, the apparatus may include an instance of the microphone system 112 that is described above with reference to FIG. 1. In some such examples, the apparatus 101 may be configured to receive a custom event via the microphone system 112. For example, microphone data received from the microphone system may indicate (for example as determined by the control system 106) a custom event sound pattern. According to some such implementations, the control system 106 may be configured to control the apparatus 101 via voice commands received via the microphone system 112.

FIG. 3A presents another example of a custom event touch pattern. In this example, the custom event touch pattern 209b is V-shaped: here, the custom event touch pattern 209b includes sides 303a and 303b, separated by an angle α. According to this example, the bisector 305a of angle α is parallel to the y axis presented in FIG. 3A. In some instances, the y axis may be parallel to a long axis of an implementation of the apparatus 101, for example as presented in FIG. 2B. In some implementations, the custom event touch pattern 209b also may correspond to a custom event gesture pattern.

FIGS. 3B and 3C present examples of received touch patterns that may be received from a touch sensor system. In these examples, a dashed outline of the custom event touch pattern 209b is superimposed on each of the received touch patterns 211b and 211c.

In the example presented in FIG. 2A, the custom event touch pattern 209a is a clockwise circular swipe, whereas the received touch pattern 211a is only an approximation of the custom event touch pattern 209a. FIGS. 3B and 3C present additional examples of what, in some instances, a control system 106 may determine to be acceptable approximations of a custom event touch pattern.

In the example presented in FIG. 3B, the received touch pattern 211b includes sides 303c and 303d, which are separated by an angle β. Here, bisector 305b bisects the angle β. According to the example presented in FIG. 3C, the received touch pattern 211c includes sides 303e and 303f, which are separated by an angle γ. In this example, bisector 305c bisects the angle γ.

A control system may be configured to evaluate various aspects of the received touch patterns 211b and 211c in order to determine whether the received touch patterns 211b and 211c are acceptable approximations of the custom event touch pattern 209b. For example, the control system may be configured to evaluate a difference between the orientation of the bisector 305a and those of the bisectors 305b and 305c, such as whether the bisectors 305b and 305c are within an angle range (for example +/−5 degrees, +/−10 degrees, +/−15 degrees, +/−20 degrees, etc.) of the bisector 305a. In some examples, the control system may be configured to determine whether the angles β and γ are within an angle range (for example +/−5 degrees, +/−10 degrees, +/−15 degrees, +/−20 degrees, etc.) of the angle α. In some examples, the control system may be configured to determine whether the sides 303c and 303e are within an angle range (for example +/−5 degrees, +/−10 degrees, +/−15 degrees, +/−20 degrees, etc.) of the side 303a. In some instances, the control system may be configured to determine whether the sides 303c and 303e are within a length range (for example +/−5%, +/−10%, +/−15%, +/−20%, +/−25%, +/−30%, etc.) of the length of side 303a. According to some examples, the control system may be configured to determine whether the sides 303d and 303f are within an angle range (for example +/−5 degrees, +/−10 degrees, +/−15 degrees, +/−20 degrees, etc.) of the side 303b. In some instances, the control system may be configured to determine whether the sides 303d and 303f are within a length range (for example +/−5%, +/−10%, +/−15%, +/−20%, +/−25%, +/−30%, etc.) of the length of side 303b.

FIG. 3D presents another example of a custom event touch pattern. In this example, the custom event touch pattern 209c is V-shaped and includes sides 303g and 303h, separated by an angle δ. According to this example, the bisector 305a of angle δ is parallel to the x axis presented in FIG. 3D. In some implementations, the custom event touch pattern 209c also may correspond to a custom event gesture pattern.

FIGS. 3E and 3F present additional examples of received touch patterns that may be received from the touch sensor system. In these examples, a dashed outline of the custom event touch pattern 209c is superimposed on each of the received touch patterns 211d and 211e. In some implementations, a control system may be configured to evaluate various aspects of the received touch patterns 211d and 211e in order to determine whether the received touch patterns 211d and 211e are acceptable approximations of the custom event touch pattern 209c. According to some examples, the evaluation may be performed as described above with reference to FIGS. 3A-3C.

Figure 4:
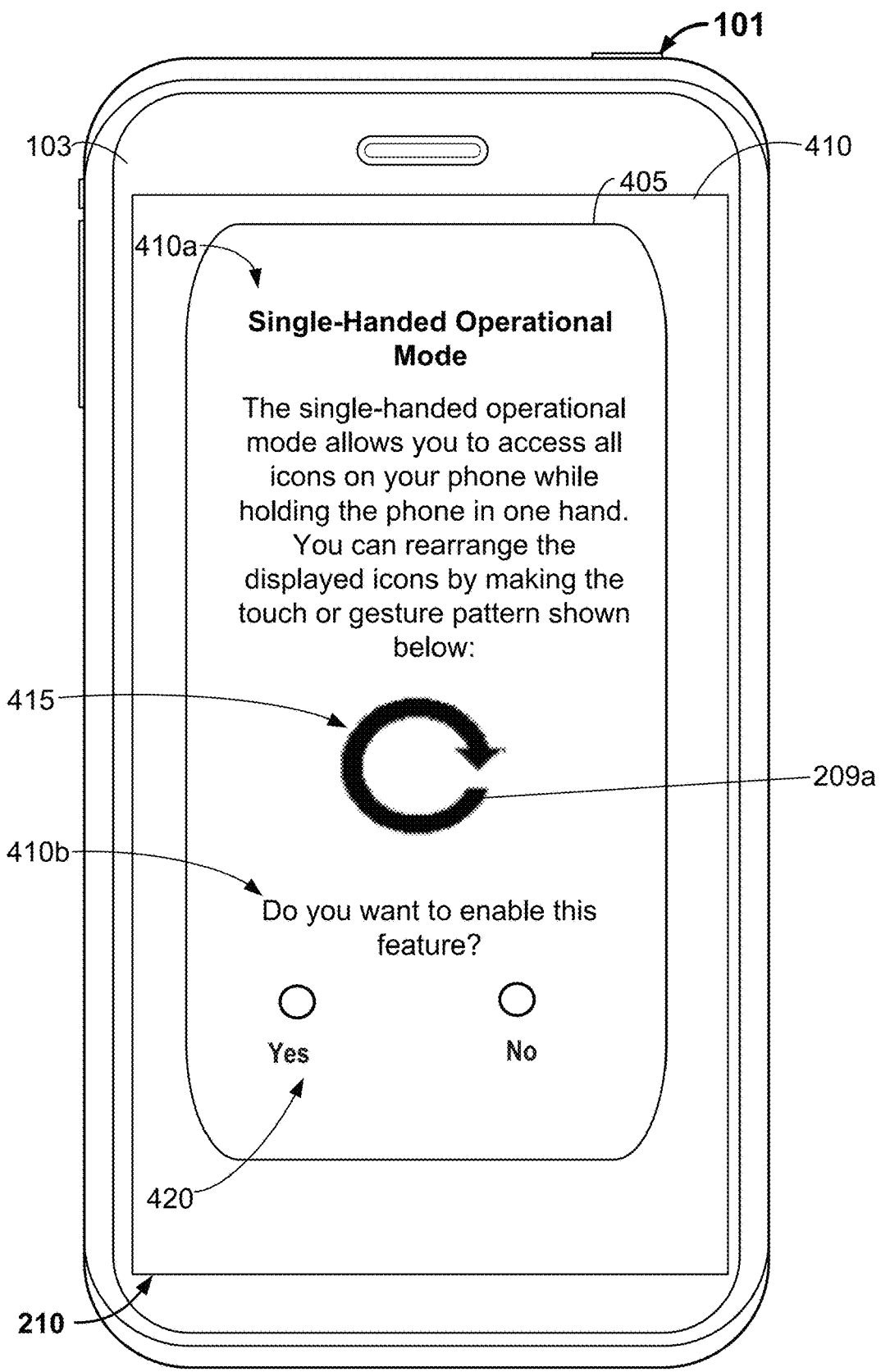
FIG. 4 presents an apparatus displaying an example of an apparatus providing a graphical user interface (GUI) for enabling or disabling a single-handed operational mode.

FIG. 4 presents an apparatus displaying an example of an apparatus providing a graphical user interface (GUI) for enabling or disabling a single-handed operational mode. As with other disclosed implementations, the scale, numbers, arrangements and types of the elements presented in FIG. 4 are merely presented for illustrative purposes. Other implementations may have different numbers, arrangements or types of elements.

In this example, the apparatus 101 is a cellular telephone. According to this example, the display 410 is an instance of the display system 110 that is described with reference to FIG. 1. In this implementation, the apparatus 101 includes an instance of the touch sensor system 103 of FIG. 1 proximate the display 210, for example residing between the display 210 and a cover. In this example, the apparatus 101 also includes instances of the control system 106 and the gesture sensor system 116 of FIG. 1, although these elements are not presented in FIG. 4.

According to this example, the GUI 405 includes textual portions 410a and 410b, graphic portion 415 and user interface portion 420. In this example, the textual portion 410a provides a brief description of a single-handed operational mode. Here, the graphic portion 415 presents an example of a custom event pattern, which is the custom event touch pattern 209a in this instance. In this example, the custom event pattern presented in the graphic portion 415 is also a custom event gesture pattern.

In this example, the textual portion 410b provides a textual prompt for a user to decide whether to enable the single-handed operational mode. Here, a user may enable the single-handed operational mode by touching the "Yes" or "No" portion of the user interface portion 420, indicating whether or not the single-handed operational mode will be enabled. In some implementations, the control system will either enable or disable the single-handed operational mode according to user input received via the user interface portion 420.

According to some implementations, the control system may be configured to disable the single-handed operational mode even when no user input has been received indicating that the single-handed operational mode should be disabled. In some such examples, the control system may be configured to disable the single-handed operational mode when the control system is executing a type of software application, such as a gaming application that involves two-handed user input.

Figure 5:
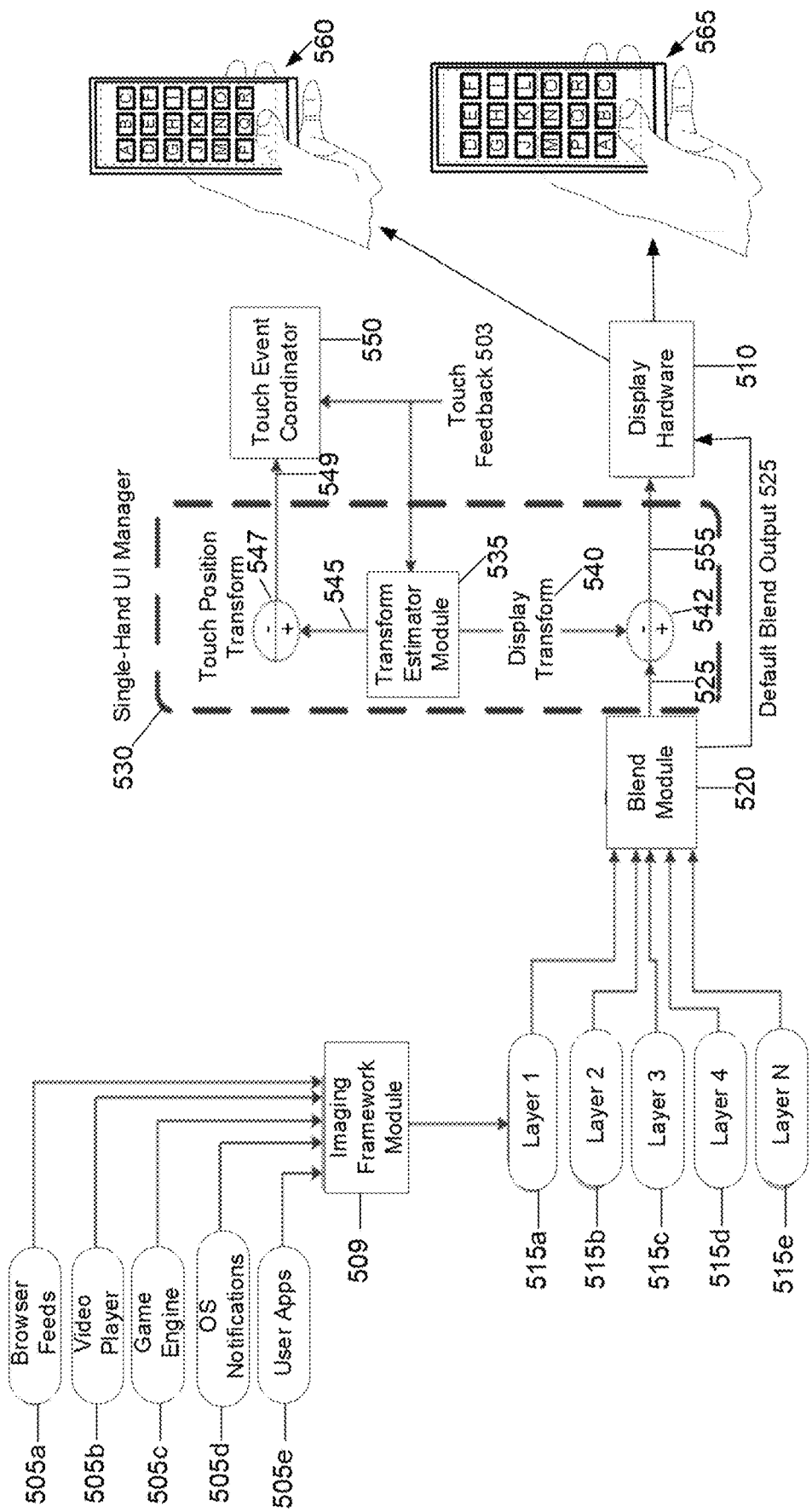
FIG. 5 presents examples of blocks for enabling a single-handed operational mode.

FIG. 5 presents examples of blocks for enabling a single-handed operational mode. As with other disclosed implementations, the scale, numbers, sequences, arrangements and types of the elements presented in FIG. 5 are merely presented for illustrative purposes. Other implementations may have different numbers, sequences, arrangements or types of elements.

In this example, software application types 505a, 505b, 505c, 505d and 505e are being executed by a control system, which may be an instance of the control system 106 that is described above with reference to FIG. 1. According to this example, the imaging framework module 509, the blend module 520, the single-hand user interface (UI) manager 530 (including the transform estimator module 535) and the touch event coordinator 550 are implemented via the control system.

In this instance, the software application types 505a, 505b, 505c, 505d and 505e are providing input (such as updates) to the imaging framework module 509. Each of the layers 515a, 515b, 515c, 515d and 515e corresponds to one of the software application types 505a, 505b, 505c, 505d and 505e. Here, the imaging framework module 509 is configured to update the layers 515a, 515b, 515c, 515d and 515e according to the input received from the software application types 505a, 505b, 505c, 505d and 505e.

In this example, the blend module 520 is configured to integrate the input received from the layers 515a, 515b, 515c, 515d and 515e, in order to present the received input on a single display. According to this example, if a single-handed operational mode has not been enabled, the blend module 520 is configured to provide a default blend output 525 to the display hardware 510, which is an instance of the display system 110 of FIG. 1. In this example, the default blend output 525 corresponds with a default layout of icons on a display. Accordingly, in this instance the display hardware 510 provides a display presentation 560 that includes the default layout of icons that is presented in FIG. 2A.

According to the example presented in FIG. 5, if a single-handed operational mode has been enabled, the single-hand UI manager 530 will be enabled and the blend module 520 will provide the default blend output 525 to the single-hand UI manager 530. In this example, the single-hand UI manager 530 includes the transform estimator module 535, which is configured to control changes of touch sensor system operations and display operations corresponding with changes in icon configurations. According to this implementation, if the touch feedback 503 (which is received from an instance of the touch sensor system 103 of FIG. 1 in this example) received by the transform estimator module 535 indicates that a custom event touch pattern has been received, the transform estimator module 535 provides display transform information 540 and the single-hand UI manager 530 causes a display transform operation 542 to be applied to the default blend output 525 received by the single-hand UI manager 530, based on the display transform information 540. In this example, the transformed blend output 555 provided by the single-hand UI manager 530 corresponds with a transformed layout of icons on a display. Accordingly, in this instance the display hardware 510 provides a display presentation 565 that includes the layout of icons that is presented in FIG. 2B.

In this example, the transform estimator module 535 also provides touch position information 545 and the single-hand UI manager 530 causes a touch position transform operation 547 to be applied to the previous touch position information. Here, transformed touch information 549 is provided to the touch event coordinator 550, which is configured to make a correspondence between icon positions and touch sensor locations. In this example, the transformed touch information 549 indicates the icon positions corresponding to the display presentation 565.

Figure 6A:
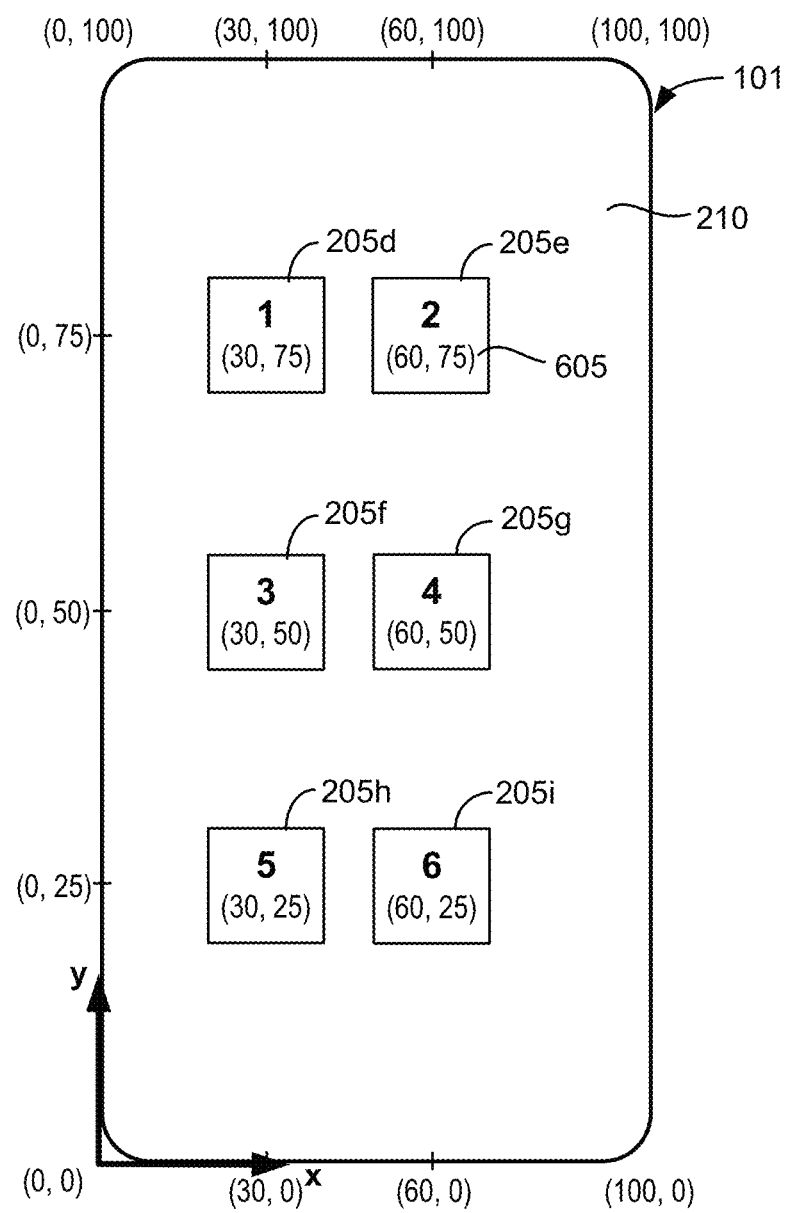
FIGS. 6A, 6B and 6C present examples of icon arrangements and corresponding touch position data.
Figure 6B:
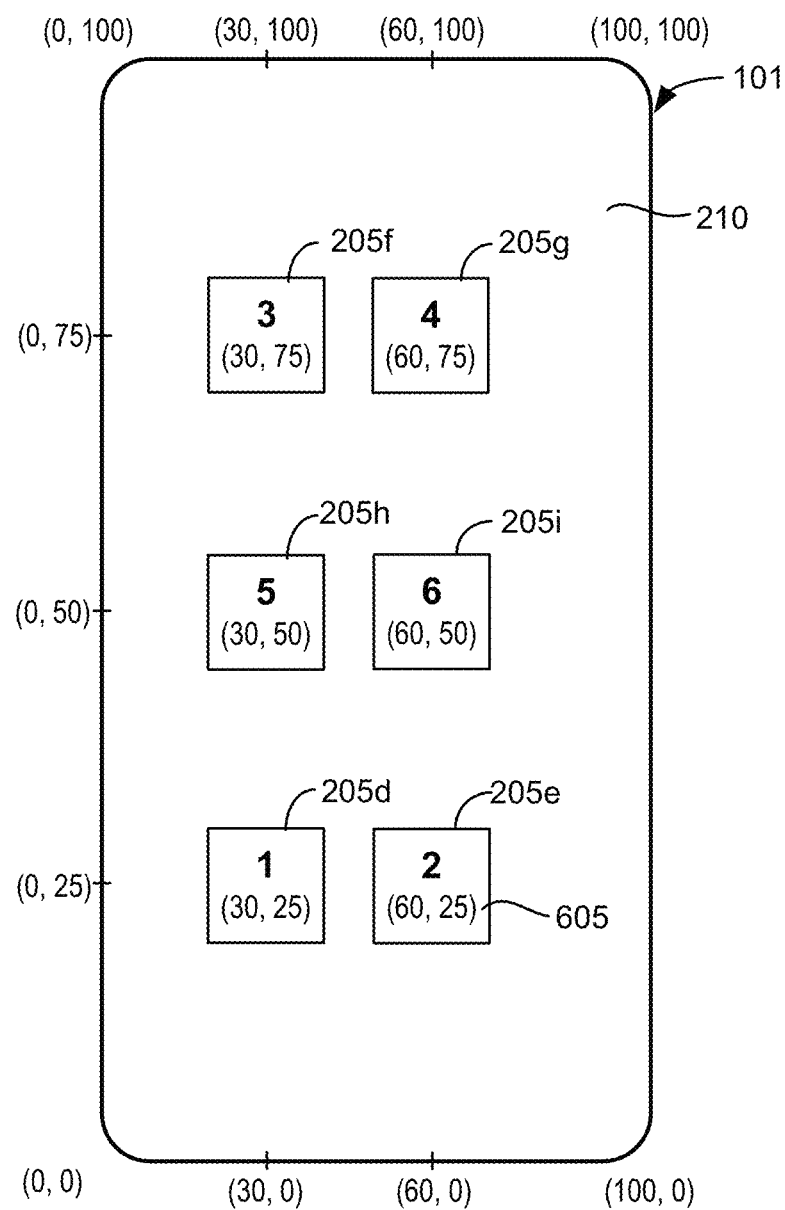
Figure 6C:
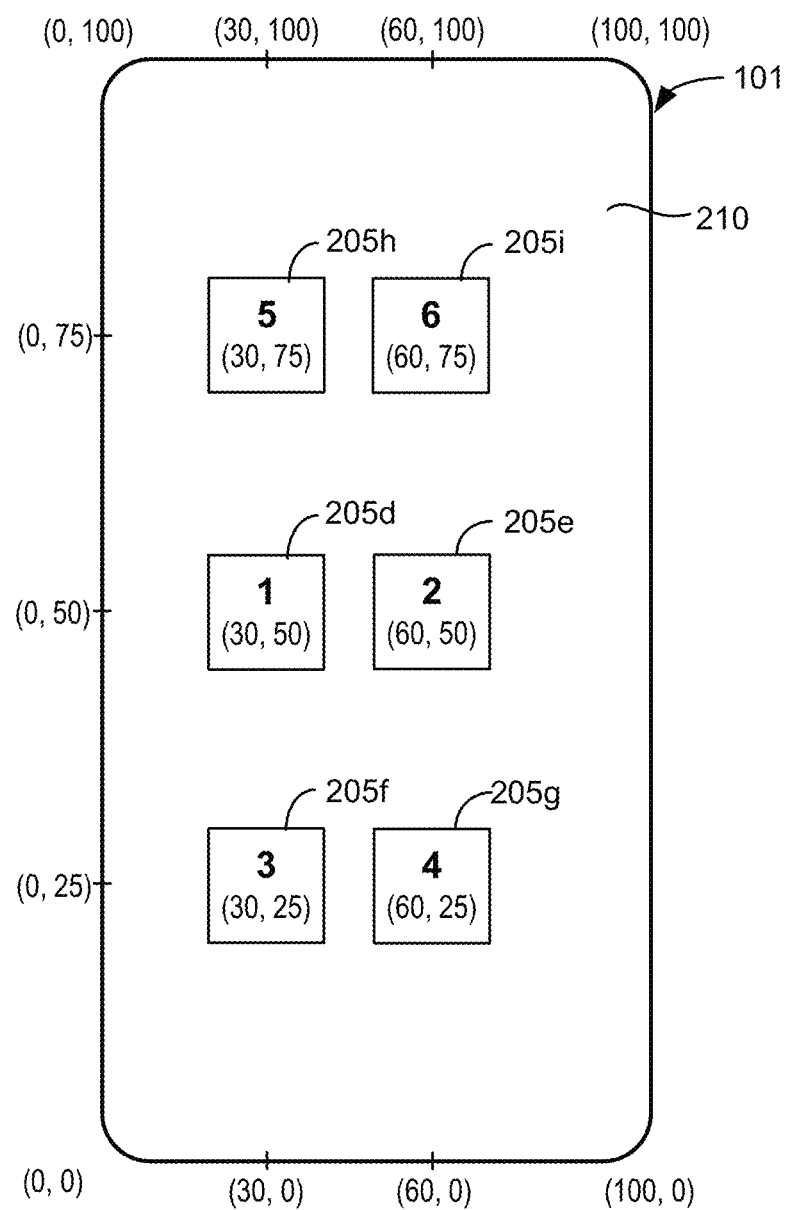

FIGS. 6A, 6B and 6C present examples of icon arrangements and corresponding touch position data. As with other disclosed implementations, the scale, numbers, sequences, arrangements and types of the elements presented in FIGS. 6A, 6B and 6C are merely presented for illustrative purposes. Other implementations may have different numbers, sequences, arrangements or types of elements.

In this example, FIG. 6A presents the display 210 presenting icons 205d, 205e, 205f, 205g, 205h and 205i in a first configuration. The first configuration corresponds to what may be referred to herein as a "first icon arrangement." As used herein, the term "first icon arrangement" does not necessarily indicate, for example, that the icon arrangement is the first ever to be presented on the display 210. Instead, in this context, the term refers to an original icon arrangement or an icon arrangement at the first stage of a described process. The icon arrangement presented in FIG. 6A may, for example, be an icon arrangement that corresponds to the default blend output 525 that is described above with reference to FIG. 5.

In this example, FIG. 6A indicates touch position data 605 for each of the icons 205d-205i in the first icon arrangement according to an x,y coordinate system. Here, the touch position data 605 indicates a single x,y coordinate for the for each of the icons 205d-205i. The x,y coordinate may, for example, be a location of a centroid of the area in which each icon 205 is displayed. The touch position data 605 would not normally be displayed, but is being presented in FIGS. 6A, 6B and 6C to indicate examples of data that may be stored by the touch event coordinator 550 of FIG. 5 corresponding to a current icon arrangement. In this example, the x and y coordinates both range from 0 at the origin to 100 at the outer edges of the apparatus. Because the length or height of the device (along the y axis) is greater than the width of the device (along the x axis), each of the x coordinates corresponds to a different distance than each of the y coordinates in this instance. Other instances may involve other examples of x and y coordinates, such as x and y coordinates that correspond to equal distances.

According to this example, FIG. 6B indicates touch position data 605 for each of the icons 205d-205i in a second icon arrangement. According to this example, the display 210 is configured to present the icons 205d-205i in the second icon arrangement associated with a first custom event. The "first custom event" may, for example be the first custom event received after the display 210 has presented the icons 205d-205i in the first icon arrangement. For example, the display 210 may be configured to present the icons 205d-205i in the second icon arrangement responsive to receiving touch sensor data from a touch sensor system or a fingerprint sensor system indicating a custom event touch pattern, responsive to receiving gesture sensor data from a gesture sensor system or a fingerprint sensor system indicating a custom event gesture pattern, or responsive to receiving microphone data from a microphone system indicating a custom event sound pattern.

In some examples, the single-hand UI manager 530 may determine the touch position data 605 for the icons 205d-205i in the second icon arrangement. For example, the transform estimator module 535 may provide touch position information 545 corresponding to the second icon arrangement. According to some examples, the single-hand UI manager 530 or the touch event coordinator 550 may be configured to maintain one or more data structures indicating current icon locations (for example, according to current values of the touch position data 605), indicating original icon locations, indicating instances of custom event detection, etc. The single-hand UI manager 530 may cause a touch position transform operation 547 to be applied to the previous touch position information, based on the touch position information 545. Transformed touch information 549 corresponding to the touch position data 605 may be provided to the touch event coordinator 550.

According to this example, FIG. 6C indicates touch position data 605 for each of the icons 205d-205i in a third icon arrangement. According to this example, the display 210 is configured to present the icons 205d-205i in the third icon arrangement associated with a second custom event. In this example, the second custom event is received after the display 210 has presented the icons 205d-205i in the second icon arrangement of FIG. 6B. The touch position data 605 for the third icon arrangement may, for example, be determined as described above with reference to FIG. 6B. One may observer by reference to FIGS. 6A-6C that in this example a user may cause the display 210 to "scroll" through the icons 205d-205i by repeatedly providing user input corresponding to a custom event.

Figure 7:
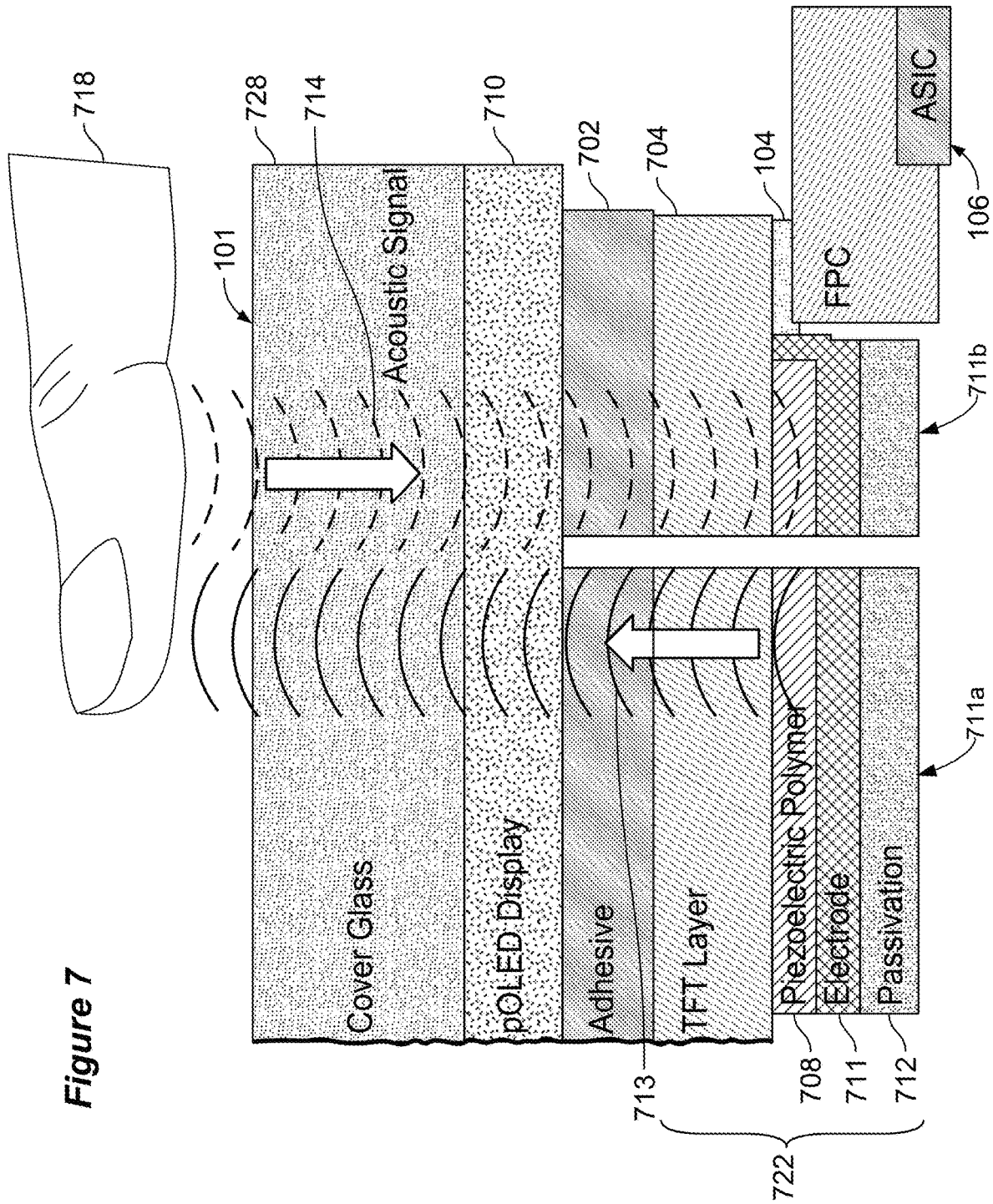
FIG. 7 presents a cross-section through a portion of the apparatus of FIG. 1 according to one example.

FIG. 7 presents a cross-section through a portion of the apparatus of FIG. 1 according to one example. As with other disclosed implementations, the scale, numbers, arrangements and types of the elements presented in FIG. 7 are merely presented for illustrative purposes. Other implementations of the apparatus 101 may have different numbers, arrangements or types of elements.

FIG. 7 provides one example of the gesture sensor system 116 of FIG. 1. In some implementations, the apparatus 101 of FIG. 7 may be configured to detect a custom event gesture pattern. In some implementations, the apparatus 101 of FIG. 7 may be configured to detect a custom event touch pattern. In some examples, the apparatus 101 of FIG. 7 may be configured to provide fingerprint sensor functionality. In some implementations, the apparatus 101 of FIG. 7 may be configured to provide the single-handed operational functionality disclosed herein, such as the single-handed operational functionality described with reference to FIGS.

2A-6C and 8 or the single-handed operational functionality described with reference to FIGS. 9-15.

According to this implementation, the apparatus 101 includes a segmented transducer array 722. In some alternative implementations, the transducer array 722 may not be segmented. In this example, the segmented transducer array 722 includes a piezoelectric layer 708, an electrode layer 711 on one side of the piezoelectric layer 708 and a thin-film transistor (TFT) layer 704 on a second and opposing side of the piezoelectric layer 708. In this implementation, the piezoelectric layer 708 includes one or more piezoelectric polymers.

According to this example, the electrode layer 711 resides between a passivation layer 712 and the piezoelectric layer 708. In some examples, passivation layer 712 may include an adhesive, such as an epoxy film, a polymer layer (such as a polyethylene terephthalate (PET) layer), etc.

In this example the TFT layer 704 includes a TFT substrate and circuitry. The TFT layer 704 may be a type of metal-oxide-semiconductor field-effect transistor (MOSFET) made by depositing thin films of an active semiconductor layer as well as a dielectric layer and metallic contacts over a TFT substrate. In some examples, the TFT substrate may be a non-conductive material such as glass.

In this example, the apparatus 101 includes a display stack 710, which is an OLED display stack in this instance. Here, the display stack 710 is attached to the TFT layer 704 via an adhesive layer 702. According to this example, the apparatus 101 includes a cover 728 on an outer surface of the display stack 710. The cover 728 is a cover glass in this instance.

In this implementation, the segmented transducer array 722 includes at least one transmitter segment 711a and at least one receiver segment 711b. The receiver segment 711b may, for example, be one of a plurality of receiver transducer segments and the transmitter segment 711a may be one of a plurality of transmitter transducer segments. According to this implementation, the TFT layer 704 and the electrode layer 711 of both the transmitter segment 711a and the receiver segment 711b are electrically coupled to at least a portion of the control system 106 via a portion of the interface system 104, which includes electrically conducting material and a flexible printed circuit (FPC) in this instance. According to this example, the electrical connections between the control system 106 and the transmitter segment 711a are out of the plane of the cross-section and are therefore not presented in FIG. 7.

In this example, the control system 106 is configured to control the transmitter segment 711a to transmit one or more acoustic waves 713 by sending one or more electrical signals via the electrode layer 711 of the transmitter segment 711a. According to this example, the acoustic wave(s) 713 are transmitted through the TFT layer 704, the display 110 and the cover glass 108. According to this example, reflections 714 of the acoustic wave(s) 713 are caused by acoustic impedance contrast between the outer surface of the target object 718 (which is a finger in this instance) and the air outside of the apparatus 101. As used herein, the term "finger" may refer to any digit, including a thumb. In this example, the reflections 714 cause the piezoelectric layer 708 of the receiver segment 711b to transmit one or more electrical signals to the control system 106 via the electrode layer 711.

According to some implementations, one or more dimensions of a transducer segment may be tuned or optimized, such as for transmission or for reception. In some examples, a transmitter segment thickness of each of the first plurality of the transmitter transducer segments 505 may be different from a receiver segment thickness of each of a first plurality of the receiver transducer segments 503. In some such examples, a receiver segment piezoelectric layer thickness of each of the first plurality of the receiver transducer segments 503 may be greater than a transmitter segment piezoelectric layer thickness of each of the first plurality of the transmitter transducer segments 505.

Figure 8:
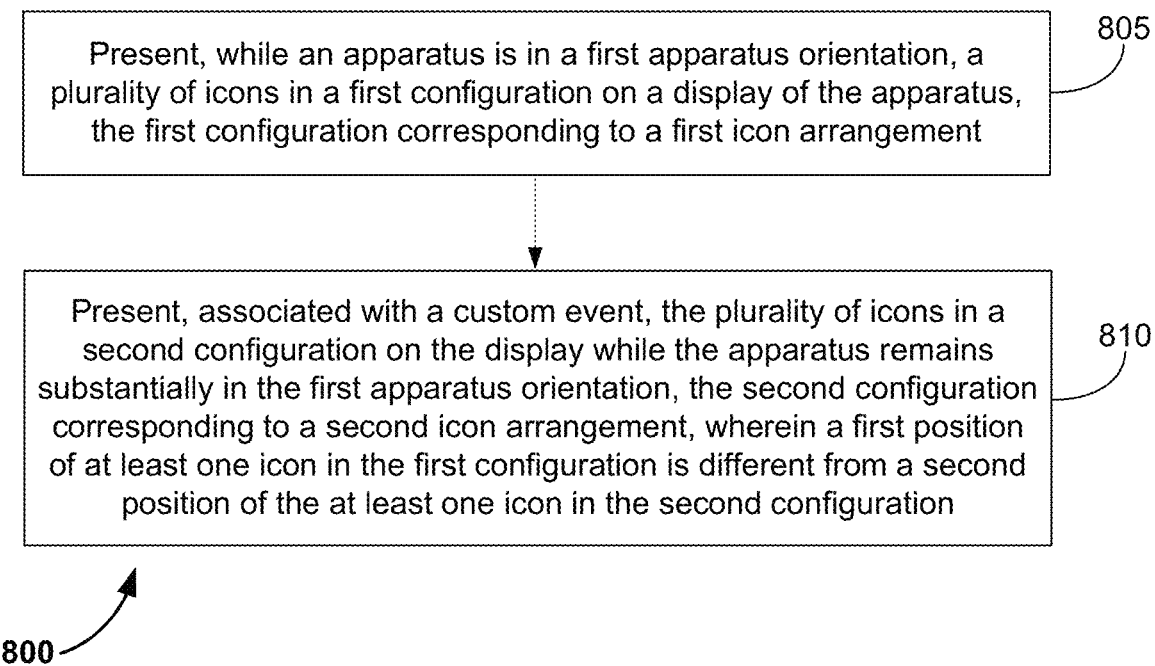
FIG. 8 is a flow diagram that presents examples of operations according to some disclosed methods.

FIG. 8 is a flow diagram that presents examples of operations according to some disclosed methods. The blocks of FIG. 8 may, for example, be performed by the apparatus 101 of FIG. 1 or by a similar apparatus. As with other methods disclosed herein, the methods outlined in FIG. 8 may include more or fewer blocks than indicated. Moreover, the blocks of methods disclosed herein are not necessarily performed in the order indicated. In some implementations, one or more blocks may be performed concurrently.

In this example block 805 involves presenting, while an apparatus is in a first apparatus orientation, a plurality of icons in a first configuration on a display of the apparatus. The first configuration corresponds to a first icon arrangement. For example, block 805 may involve a control system controlling the display 210 to present the icon arrangement presented in FIG. 2A or the icon arrangement presented in FIG. 6A.

According to this example, block 810 involves presenting, associated with a custom event, the plurality of icons in a second configuration on the display while the apparatus remains substantially in the first apparatus orientation. In this instances, the second configuration corresponds to a second icon arrangement where a first position of at least one icon in the first configuration is different from a second position of the at least one icon in the second configuration. According to some examples, the at least one icon may be presented in a first half of the display in the first configuration and may be presented in a second half of the display in the second configuration. In some examples, a first icon spacing of the first configuration may equal to a second icon spacing of the second configuration. In some instances, a row of icons including the at least one icon may be presented in the first half of the display in the first configuration and the row of icons may be presented in the second half of the display in the second configuration. According to some such examples, the row of icons may be presented proximate a first side of the display in the first configuration and may be presented proximate a second side of the display in the second configuration. The second side may be opposite the first side. For example, the first side may be the side 220a presented in FIG. 2B and the second side may be the side 220b.

For example, if block 805 involves controlling the display 210 to present the icon arrangement presented in FIG. 2A, block 810 may involve controlling the display 210 to present the icon arrangement presented in FIG. 2B. If block 805 involves controlling the display 210 to present the icon arrangement presented in FIG. 6A, block 810 may involve controlling the display 210 to present the icon arrangement presented in FIG. 6B.

In some examples, the control system may determine the apparatus orientation (such as the orientation of the apparatus 101) according to inertial sensor data from an inertial sensor system, such as the inertial sensor system 114 of FIG. 1. Similarly, the control system may determine whether the apparatus remains substantially in the first apparatus orientation according to inertial sensor data from the inertial sensor system. For example, the control system may determine that the apparatus remains substantially in the first apparatus orientation if the inertial sensor data indicates that the apparatus has been rotated less than a threshold number of degrees with respect to the first apparatus orientation (for example 5 degrees, 10 degrees, 15 degrees, 20 degrees, etc.) relative to a coordinate system, for example a coordinate system of the apparatus 101.

In some instances, the custom event may be, or may include, touch sensor data received from a touch sensor system or a fingerprint sensor system indicating a received touch pattern. According to some examples the custom event may be, or may include, gesture sensor data received from a gesture sensor system or a fingerprint sensor system indicating a custom event gesture pattern. In some instances, the custom event may be, or may include, microphone data received from a microphone system indicating a custom event sound pattern.

Figure 9:
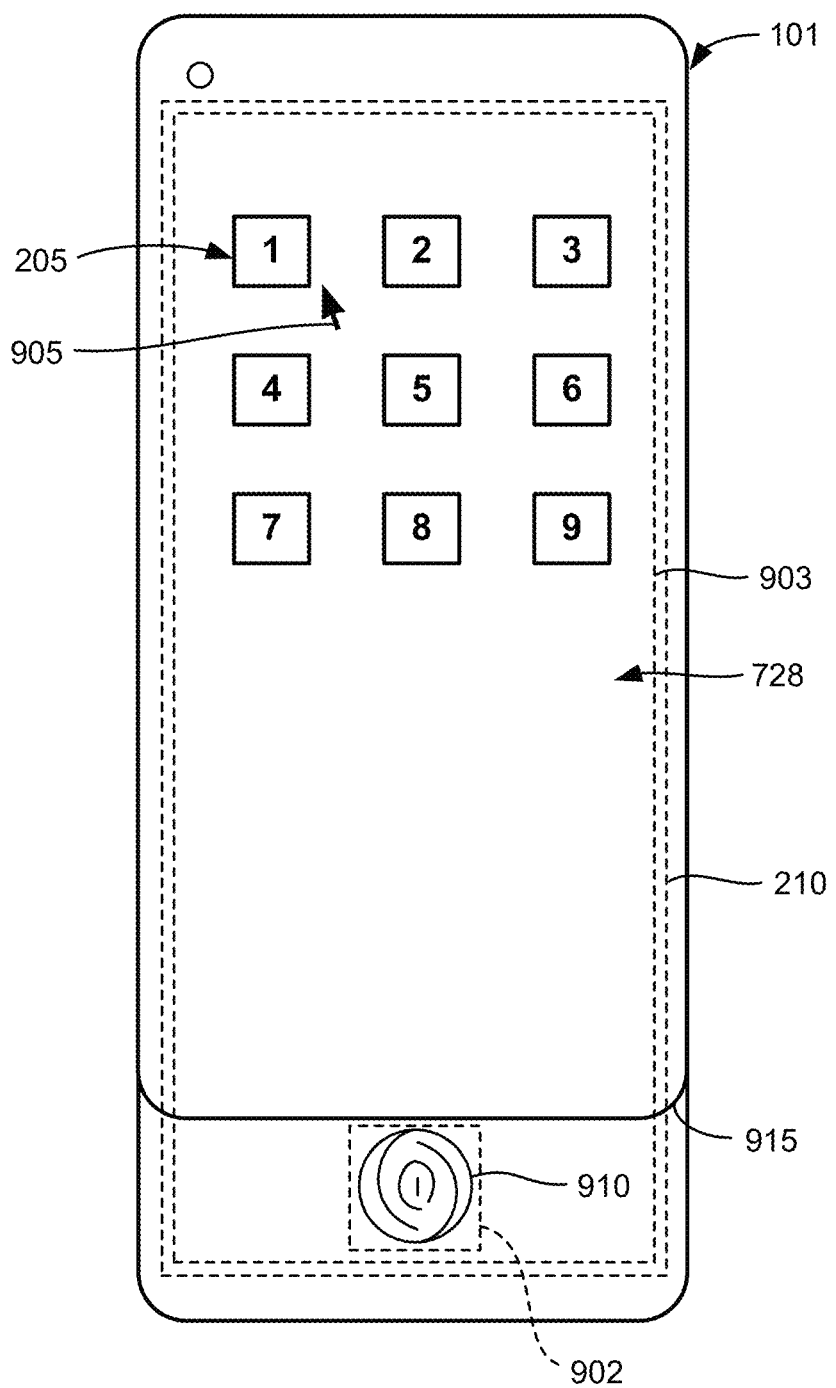
FIG. 9 presents an example of an apparatus that is configured to implement some alternative single-handed operational methods.

FIG. 9 presents an example of an apparatus that is configured to implement some alternative single-handed operational methods. As with other disclosed implementations, the scale, numbers, arrangements and types of the elements presented in FIG. 9 are merely presented for illustrative purposes. Other implementations may have different numbers, arrangements or types of elements.

According to this example, the apparatus 101 is configured to provide what may be referred to herein as "mouse functionality" or "joystick functionality." In this example, the apparatus 101 includes the display 210, which is an instance of the display system 110 of FIG. 1. According to this example, the control system 106 (not presented in FIG. 9) is controlling the display 210 to present a plurality of icons 205, numbered 1 through 9. In this example, the control system 106 is controlling the display 210 to present a cursor 905.

Here, the apparatus 101 includes an instance of the fingerprint sensor system 102 of FIG. 1. In this example, the fingerprint sensor system active area 902 corresponds with a portion of the area of the display 210. According to this example, the fingerprint sensor system active area 902 resides proximate one side of the display 210 and the cover 728 resides proximate a second and opposing side of the display 210. Here, the control system 106 is controlling the display 210 to present a fingerprint image 910 within the fingerprint sensor system active area 902, in order to indicate the location of the fingerprint sensor system active area 902. The fingerprint sensor system active area 902 is one example of what may be referred to herein as a "control area."

In this example, the apparatus 101 also includes an instance of the touch sensor system 103 of FIG. 1. According to this example, the touch sensor system active area 903 resides between the display 210 and the cover 728. In some instances, the control area may be a portion of the touch sensor system active area 903. Alternatively, or additionally, the control area may be a portion of a gesture sensor system active area.

According to this implementation, the control system 106 is configured to receive first sensor system data corresponding with movement of a target object (such as a finger or other digit) in contact with the cover 728 in a control area. In some alternative implementations, the control system 106 may be configured to receive first sensor system data corresponding with movement of a target object proximate, but not in contact with, the cover 728 in a control area. The control area may be the fingerprint sensor system active area 902, a portion of the touch sensor system active area 903 or a portion of a gesture sensor system active area. In this example, control system 106 is configured to the control, associated with the first sensor system data, displayed cursor positions of the first display in which the cursor 905 is presented.

According to this example, the control system 106 is configured to receive second sensor system data corresponding with contact of the target object within the control area. According to some examples, the second sensor system data may correspond with one or more taps or presses within the control area. In this example, the control system 106 is configured to initialize, associated with the second sensor system data, a selected software application corresponding with a displayed cursor position of a selected icon. The displayed cursor position may, for example, overlap with the position of a selected icon.

In some examples, the control system 106 may be configured to control the display 210 to present the plurality of icons in a first area prior to receiving the first sensor system data and to present the plurality of icons in a second area associated with (for example responsive to) receiving the first sensor system data. The first area may be larger than the second area. In the example presented in FIG. 9, the second area is the area 915. FIG. 9 represents a configuration presented at a time after receiving the first sensor system data. Prior to receiving the first sensor system data, the icons 205 were displayed in a first area that occupied a larger portion of the display 210 than the area 915.

According to some implementations, the control system 106 may be configured to present a control icon in the control area. The fingerprint image 910 presented in FIG. 9 is one example of a control icon. Other implementations may involve presenting other examples of a control icon. In some examples, the control icon may be, or may include, a touchpad icon.

Figure 10A:
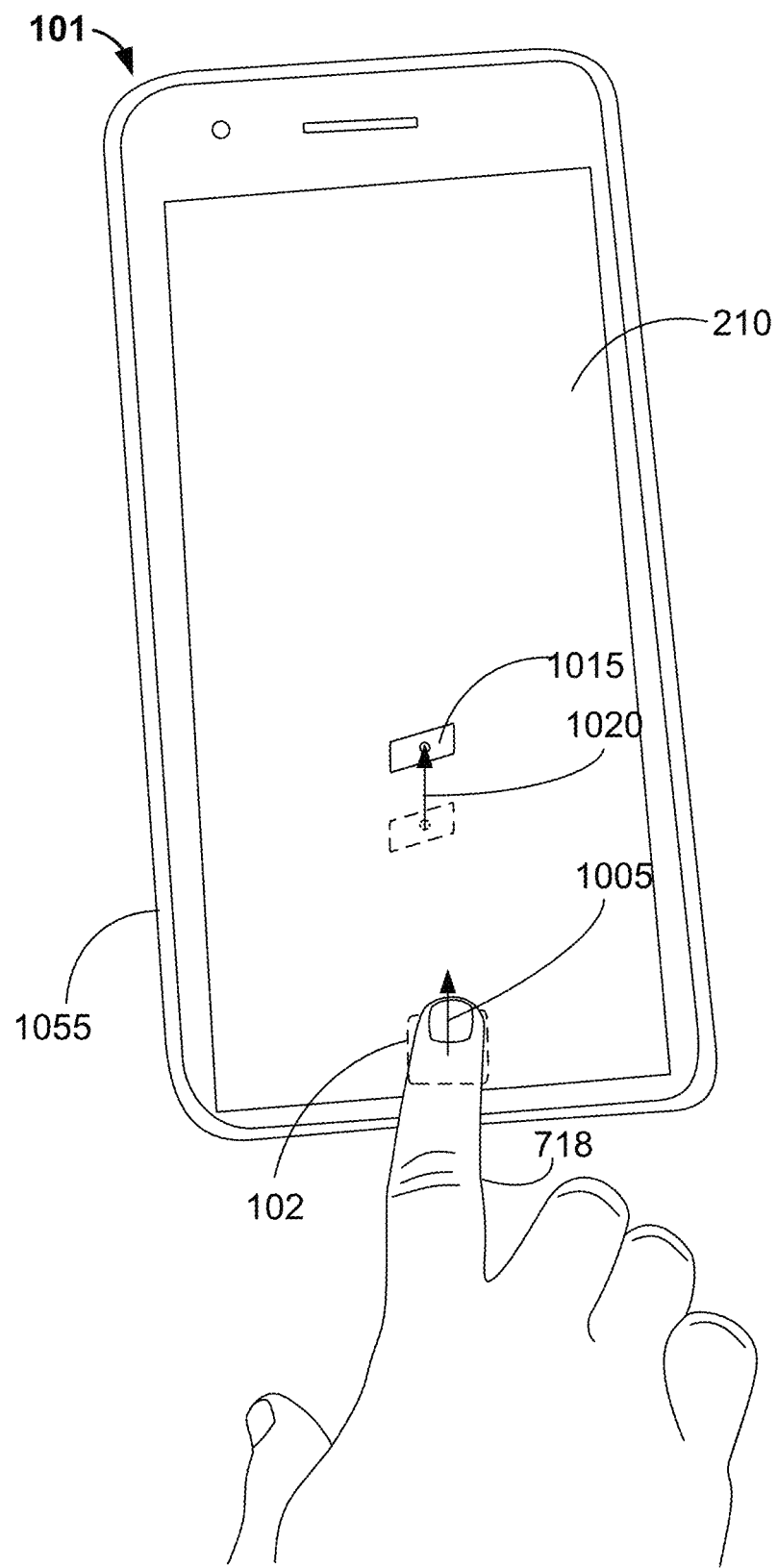
FIGS. 10A and 10B present examples of a mobile device that is configured for providing single-handed functionality.
Figure 10B:
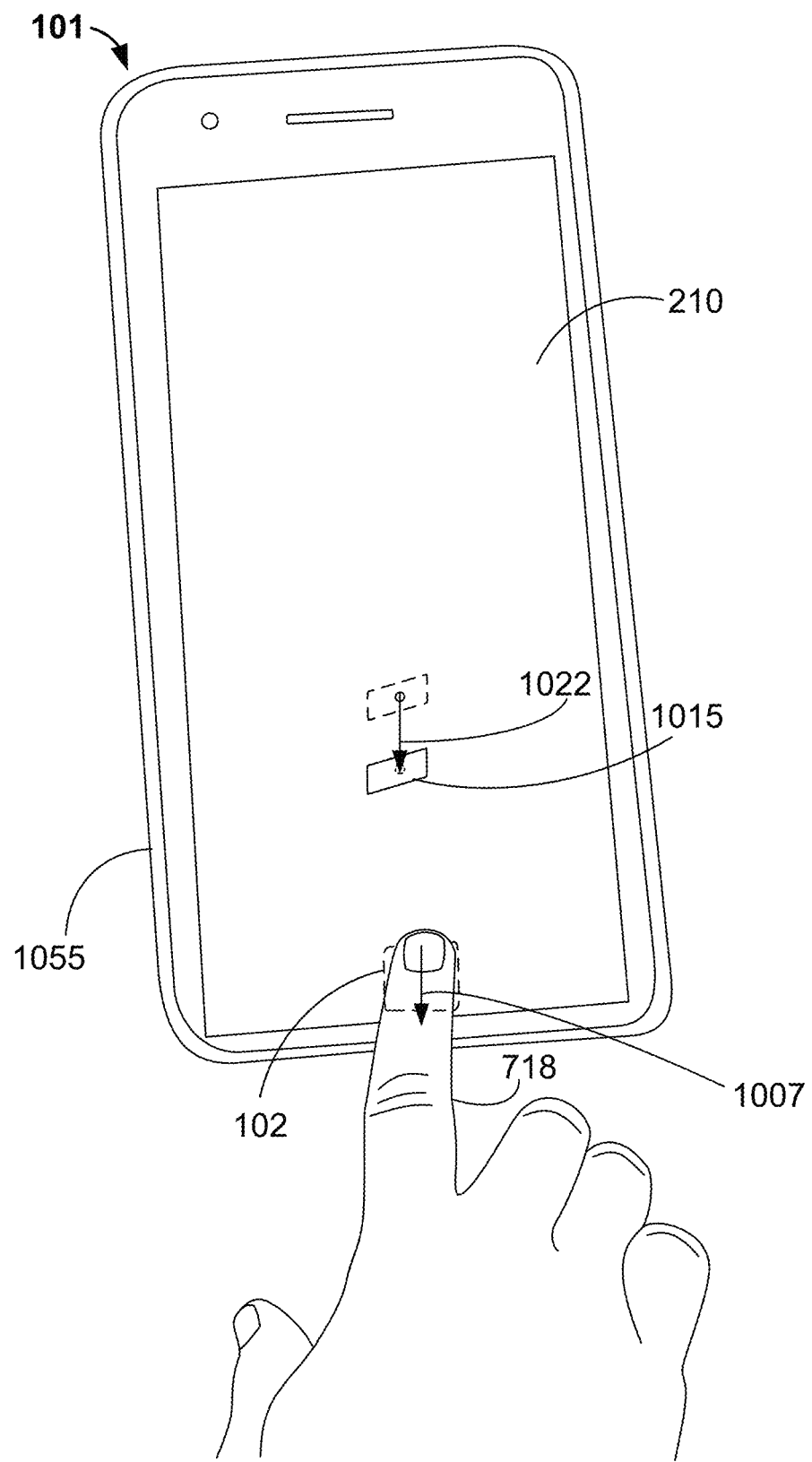

FIGS. 10A and 10B present examples of a mobile device that is configured for providing single-handed functionality. In these examples, a control system of the apparatus 101 may be configured for providing mouse functionality or joystick functionality for controlling the apparatus 101 based, at least in part, on a detected finger force direction or through one or more secondary effects resulting from such force. Examples of secondary effects resulting from a finger force include the relative strength of reflections from fingerprint valleys and ridges, the relative position of such stronger or weaker reflections, or the distance between such reflections. In the example presented in FIG. 10A, a control system is detecting an "upward" force of the finger 718, in the direction of the arrow 1005, according to changes in signals received from a fingerprint sensor system 102 of the apparatus 101. One example is presented in FIG. 7A and is described below. In response to detecting the upward force of the finger 718, the control system may cause a display 210 of the apparatus 101 to move an image of an object 1015 in the direction of the arrow 1020, which is parallel to the arrow 1005 in this example. Although the object 1015 is a parallelogram in this example, in other examples the object 1015 may be a cursor, an icon, etc. In some implementations, the fingerprint sensor system 102 may be, or may at least be a portion of, an ultrasonic sensor system 102 such as described elsewhere herein. However, in some implementations the fingerprint sensor system 102 may be another type of fingerprint sensor, such as an optical fingerprint sensor, a capacitive fingerprint sensor, a radio frequency fingerprint sensor, a thermal fingerprint sensor, etc.

In the example presented in FIG. 10B, a control system is detecting a "downward" force of the finger 718, in the direction of the arrow 1007, according to changes in signals received from an ultrasonic sensor system of the apparatus 101. One example of an image corresponding to such signals is presented in FIG. 7B and is described below. In response to detecting the downward force of the finger 718, the control system causes the display 210 to move the image 1015 in the direction of the arrow 1022, which is parallel to the arrow 1007 in this example. In some implementations, the finger 718 in FIG. 10A and FIG. 10B may slide upwards or downwards upon a platen surface of the apparatus 101. In other implementations, the finger 718 in FIG. 10A and FIG. 10B may be moved upwards or downwards on the platen surface without sliding, relying on shear forces, distortions of fingerprint ridges and valleys, or displacements of fingerprint features with respect to an edge of the fingerprint region to make the determinations.

Figure 11A:
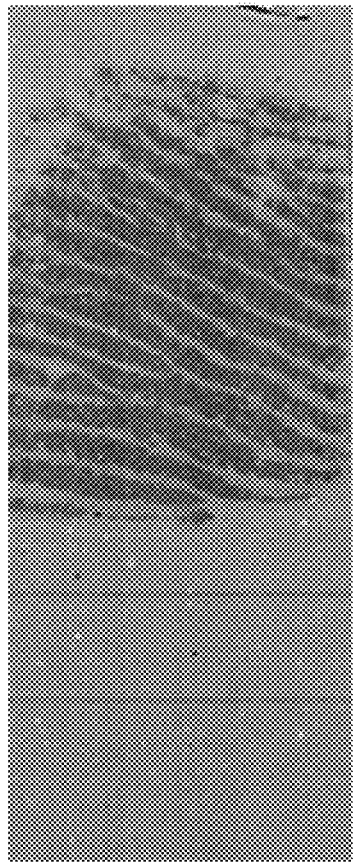
FIGS. 11A and 11B present images that represent fingerprint image data corresponding to upward and downward finger forces, respectively.
Figure 11B:
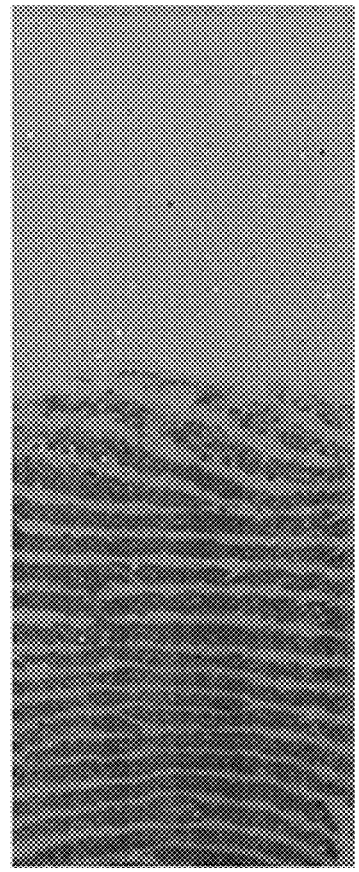

FIGS. 11A and 11B present images that represent fingerprint image data corresponding to upward and downward finger forces, respectively. In FIG. 11A, an upward force is indicated by the presence of fingerprint ridge and valley features primarily in the upper portion of the image, whereas in FIG. 11B a downward force is indicated by the presence of fingerprint ridge and valley features primarily in the lower portion of the image. This effect may or may not be caused by sliding the finger. In some instances, this effect may be a result of rocking the finger forward or backward, or by changes in the shape of the finger due to shear stress. Such changes in the shape of a finger may be referred to herein as "finger distortions." Accordingly, in some implementations a finger force direction may be detected according to changes in fingerprint ridge patterns corresponding with a shear stress of fingerprint ridges in contact with the platen. In some implementations, the speed at which a cursor or pointer may be moved on a display of the mobile device may be determined from measurements of the reflected ultrasonic wave and calculations of the magnitude and direction of the finger forces. For example, a higher measured finger force (normal force or shear force) may result in faster movement of a cursor or pointer on the display. Similarly, a lower measured finger force may result in slower movement of the cursor or pointer on the display.

Figure 12:
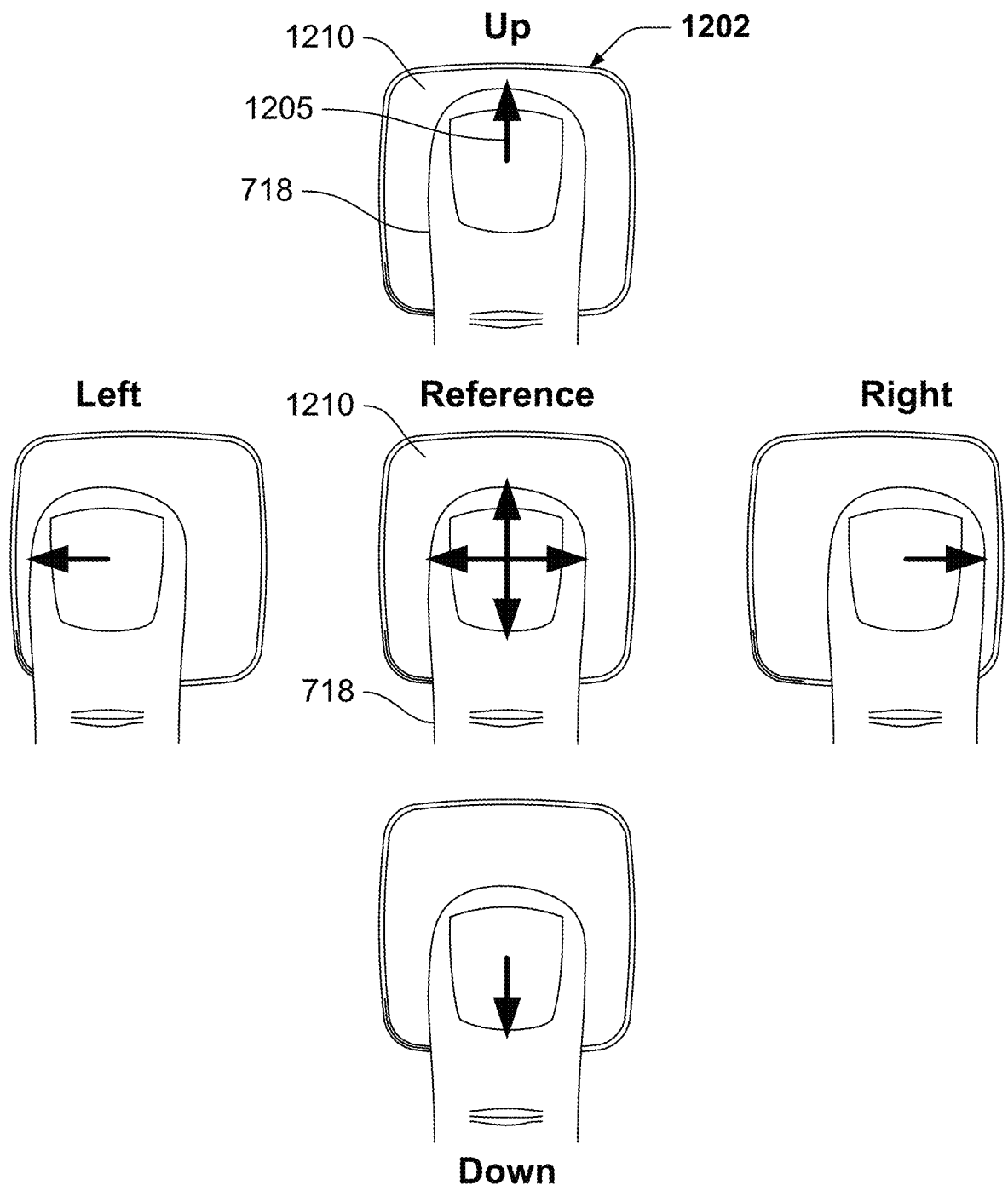
FIGS. 12 and 13 present additional examples of single-handed operational modes.
Figure 13:
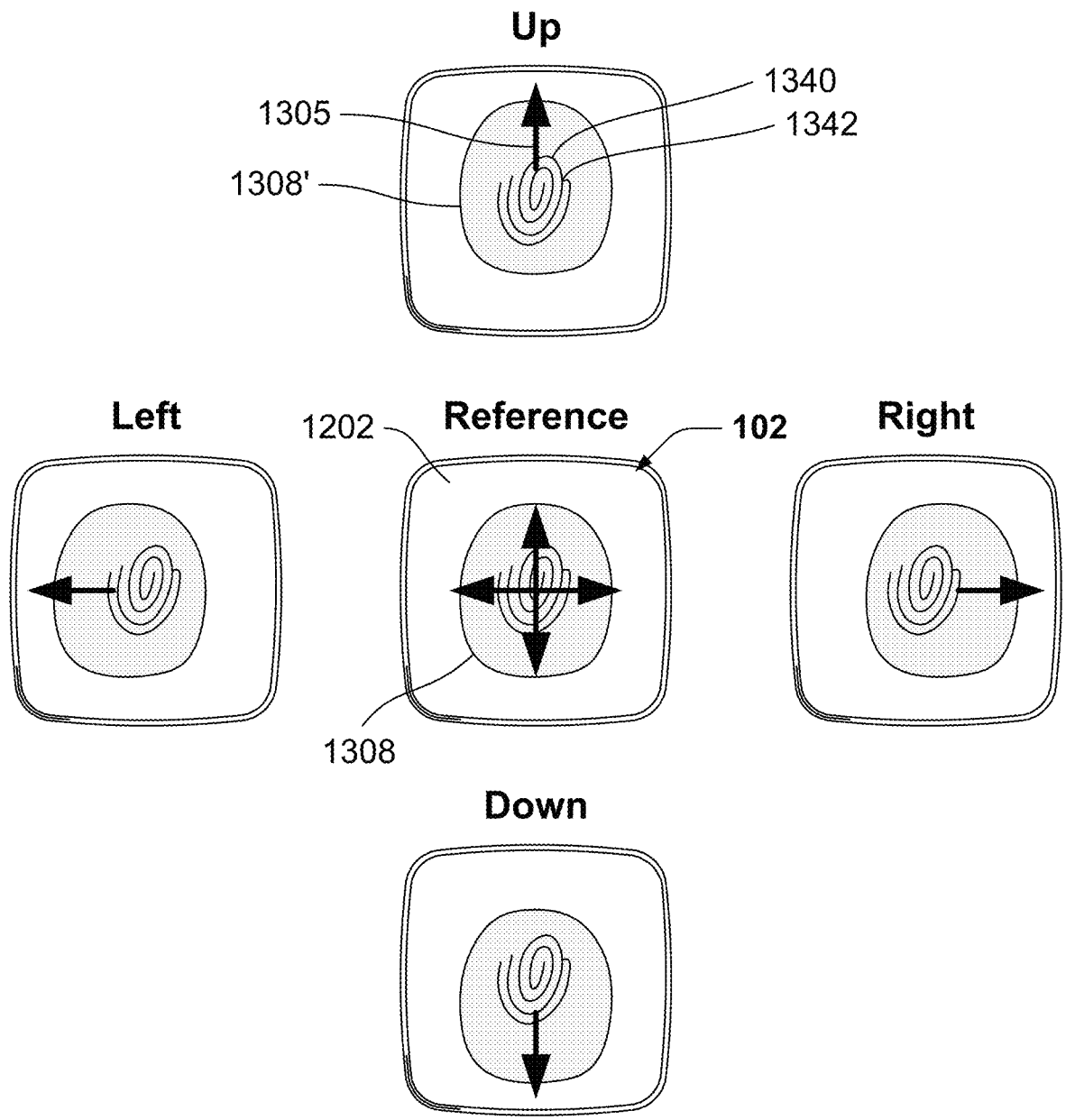

FIGS. 12 and 13 present additional examples of single-handed operational modes. FIG. 12 presents illustrative images that represent translational movements 1205 of a finger 718 on a control area 1202. In this example, the control area 1202 corresponds with a displayed image of a control icon 1210, which is a touchpad icon in this instance. The control area 1202 may, for example, correspond with a fingerprint sensor system active area, such as the fingerprint sensor system active area 902 that is described above with reference to FIG. 9. In other examples, the control area 1202 may correspond with a portion of a touch sensor system active area or a gesture sensor system active area. A reference position of the finger 718 may correspond with the initial placement of the finger 718 on the control area 1202. Directions corresponding to up, down, left, right and combinations thereof may correspond to translational movements of the finger 718 on the control area 1202, such as may occur when a dry finger or a lightly pressed finger is slid along a surface of the control area 1202.

FIG. 13 presents illustrative images that represent movement of a fingerprint contact area 1308 with respect to one or more fingerprint features, which include fingerprint features 1340 and 1342, resulting from shear forces generated by exertions of a finger on a control area 1202 of the fingerprint sensor system 102 and corresponding navigational inputs. Fingerprint features 1340 and 1342 may correspond, for example, to a fingerprint whorl and a bifurcation point, respectively, in a fingerprint image. A reference position of the finger may correspond with the initial placement of the finger on the control area 1202 that generates a fingerprint contact area 1308 and associated contact area geometry. Directions corresponding to up, down, left, right and combinations thereof may correspond to movement of the fingerprint contact area 1308' in the direction of the arrow 1305 or other directions due to exertions of the finger against the control area 1202 where the finger fails to slide along the surface of the control area 1202, causing changes to the fingerprint contact area 1308 and associated geometry including distances between the periphery of the fingerprint contact area 1308 and the fingerprint features 1340 and 1342. In some implementations, determination of the distances between the periphery of the fingerprint contact area 1308 and fingerprint features 1340 and 1342 in one or more directions may indicate a navigation function in a preferred direction to be performed.

Figure 14:
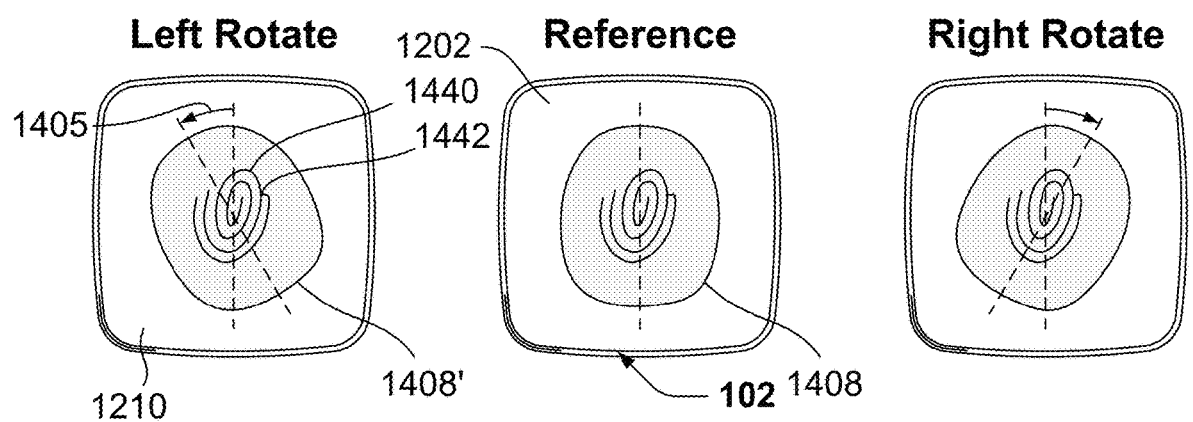
FIG. 14 presents yet another example of a single-handed operational mode.

FIG. 14 presents yet another example of a single-handed operational mode. According to some examples, rotational movements of a finger may be detected using a sensor, such as a fingerprint sensor. FIG. 14 presents illustrative images that represent rotational movement of a fingerprint contact area 1408 with respect to one or more fingerprint features, which include fingerprint features 1430 and 1432, resulting from torsional forces generated by exertions of a finger on a control area 1202 of a fingerprint sensor 102 and corresponding navigational inputs. In some implementations, rotations clockwise or counterclockwise may be determined by acquiring fingerprint images from the fingerprint sensor, determining the size and shape of a periphery of a reference fingerprint contact area 1408, then acquiring additional fingerprint images from the fingerprint sensor and determining the size and shape of the updated fingerprint contact area 1408' to allow determination of the direction of rotation and the angle of rotation. In the implementation illustrated, fingerprint features 1430 and 1432 stay fixed (or substantially fixed) in position on the control area 1202 while the finger is exerted in a twisting, angular motion in the direction of arrow 1405 on the control area 1202 without sliding or slipping of the fingerprint features 1430 and 1432. Other fingerprint features such as ridges, valleys and minutiae near the periphery of the updated fingerprint contact area 1408' may be analyzed for distortions due to shear stress to determine the desired rotation direction and rotation magnitude. Determination of rotational motions of the finger may allow initiating or performing functions such as zoom in, zoom out, increase or decrease volume, or switch from portrait to landscape view or from landscape to portrait view on a display.

Figure 15:
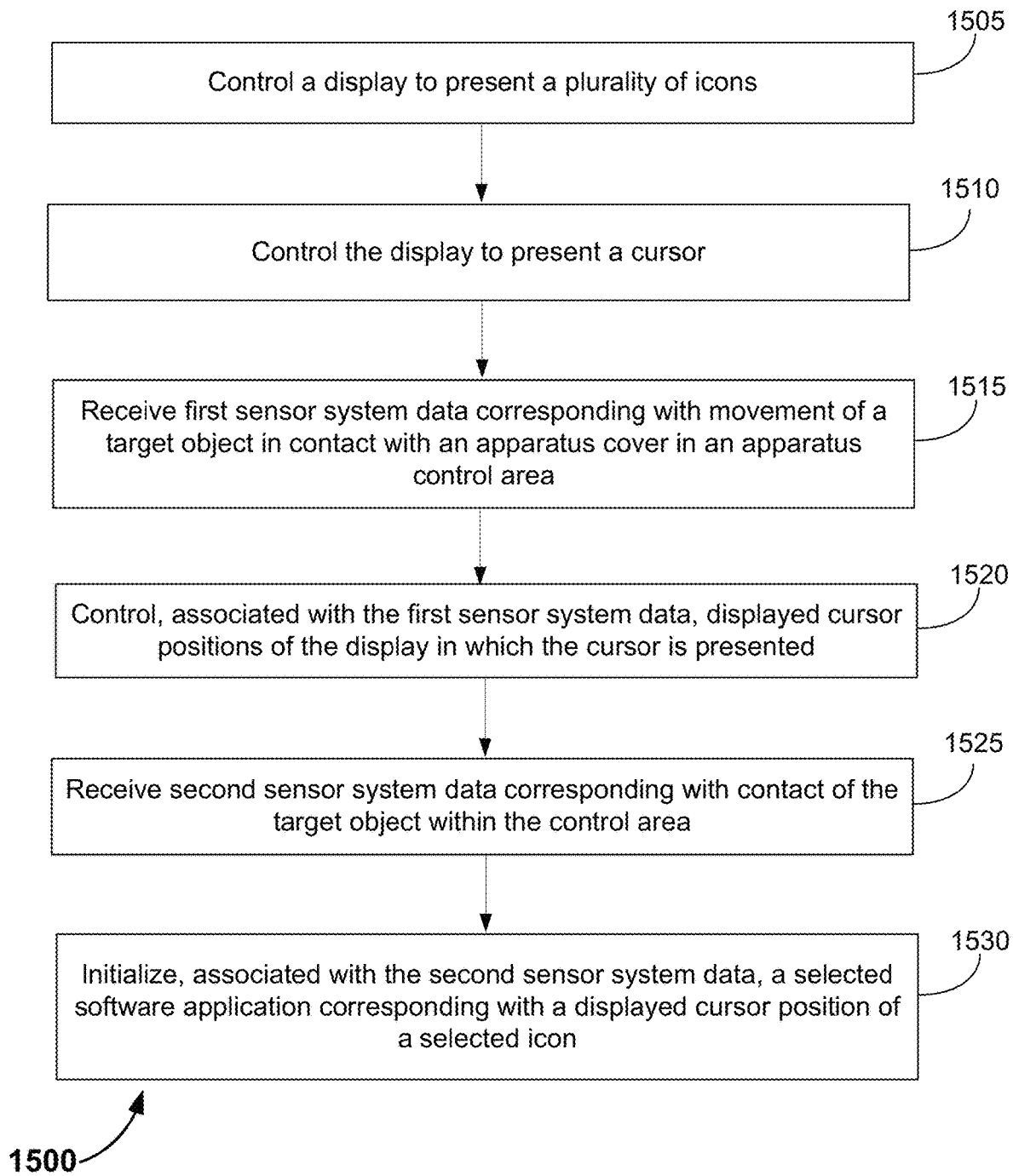
FIG. 15 is a flow diagram that presents examples of operations according to some additional disclosed methods.

FIG. 15 is a flow diagram that presents examples of operations according to some additional disclosed methods. In some examples, the apparatus 101 of FIG. 1 or a similar apparatus may perform the blocks of FIG. 15. As with other methods disclosed herein, the methods outlined in FIG. 15 may include more or fewer blocks than indicated. Moreover, some examples of the method 1500 may involve performing the blocks of FIG. 15 in a sequence that is different from what is presented in FIG. 15. In some implementations, the method 1500 may involve performing one or more blocks concurrently.

In this example, block 1505 involves controlling a display to present a plurality of icons. For example, block 1505 may involve a control system controlling the display 210 to present the icon arrangement presented in FIG. 9.

According to this example, block 1510 involves controlling a display to present a cursor. For example, block 1510 may involve a control system controlling the display 210 to present the cursor 905 presented in FIG. 9.

In this example, block 1515 involves receiving first sensor system data corresponding with movement of a target object in contact with an apparatus cover in an apparatus control area. For example, block 1515 may involve receiving fingerprint sensor data from a fingerprint sensor system corresponding with movement of a digit in contact with, or proximate, an apparatus cover in the fingerprint sensor system active area 902 presented in FIG. 9. In some other examples, block 1515 may involve receiving touch sensor data or gesture sensor data corresponding with movement of a target object in contact with, or proximate, an apparatus cover in an apparatus control area.

According to this example, block 1520 involves controlling, associated with the first sensor system data, displayed cursor positions of the display in which the cursor is presented. For example, block 1520 may involve controlling positions of the cursor 905 presented in FIG. 9 responsive to the first sensor system data.

In this example, block 1525 involves receiving second sensor system data corresponding with contact of the target object within the control area. The second sensor system data may, for example, correspond with one or more taps or presses within the control area.

According to this example, block 1530 involves initializing, associated with the second sensor system data, a selected software application corresponding with a displayed cursor position of a selected icon. For example, block 1530 may involve initializing a software application corresponding with one of the icons 205 presented in FIG. 9 responsive to receiving the second sensor system data, such as at a time during which the cursor 905 is positioned adjacent to, or in, the area in which the icon 205 is displayed.

Implementation examples are described in the following numbered clauses:

1. An apparatus, including: a display system including a first display; a cover proximate an outer surface of the first display; a sensor system proximate the first display; and a control system electrically connected with the display system and the sensor system, the control system configured to: control the display system to present a plurality of icons on the first display; control the display system to present a cursor on the first display; receive first sensor system data corresponding with movement of a target object in contact with the cover in a control area; control, in associated with the first sensor system data, displayed cursor positions of the first display in which the cursor is presented; receive second sensor system data corresponding with contact of the target object within the control area; and initialize, associated with the second sensor system data, a selected software application corresponding with a displayed cursor position of a selected icon.

2. The apparatus of clause 1, where the sensor system includes a fingerprint sensor system and where the control area corresponds with a fingerprint sensor system area.

3. The apparatus of clause 1 or clause 2, where the sensor system includes a touch sensor system and where the control area corresponds with a touch sensor system area.

4. The apparatus of any one of clauses 1-3, where the sensor system includes a gesture sensor system and where the control area corresponds with a gesture sensor system area.

5. The apparatus of any one of clauses 1-4, where the first sensor system data corresponds with movement of a digit within the control area.

6. The apparatus of any one of clauses 1-5, where the control system is further configured to control the display system to present a control icon in the control area.

7. The apparatus of clause 6, where the control icon includes a touchpad icon.

8. The apparatus of any one of clauses 1-7, where the second sensor system data corresponds with one or more taps or presses within the control area.

9. The apparatus of any one of clauses 1-8, where the control system is further configured to: control the display system to present the plurality of icons in a first area prior to receiving the first sensor system data; and control the display system to present the plurality of icons in a second area associated with receiving the first sensor system data, where the first area is larger than the second area.

Further implementation examples are described in the following numbered clauses:

10. An apparatus, including:
a display configured to:
present, while the apparatus is in a first apparatus orientation, a plurality of icons in a first configuration on the display, the first configuration corresponding to a first icon arrangement; and
present, associated with a custom event, the plurality of icons in a second configuration on the display while the apparatus remains substantially in the first apparatus orientation, the second configuration corresponding to a second icon arrangement, where a first position of at least one icon in the first configuration is different from a second position of the at least one icon in the second configuration.

11. The apparatus of clause 10, where the at least one icon is displayed in a first half of the display in the first configuration and where the at least one icon is displayed in a second half of the display in the second configuration.

12. The apparatus of clause 10 or clause 11, where a row of icons including the at least one icon is displayed in the first half of the display in the first configuration and where the row of icons is displayed in the second half of the display in the second configuration.

13. The apparatus of clause 12, where the row of icons is displayed proximate a first side of the display in the first configuration and where the row of icons is displayed proximate a second side of the display in the second configuration, the second side being a side opposite the first side.

14. The apparatus of any one of clauses 10-13, further including a touch sensor system proximate the display.

15. The apparatus of clause 14, where the custom event includes touch sensor data received from the touch sensor system indicating a custom event touch pattern.

16. The apparatus of clause 14, further including a control system, where each icon of the plurality of icons corresponds with a software application of a plurality of software applications the control system is configured to initialize in association with receiving an icon touch indication from the touch sensor system, the icon touch indication corresponding to a touch in an icon position.

17. The apparatus of clause 16, further including a control system configured to implement a transform estimator module for controlling changes of touch sensor system operations corresponding with changes in icon configurations.

18. The apparatus of any one of clauses 1-17, further including a gesture sensor system, where the custom event includes gesture sensor data received from the gesture sensor system indicating a custom event gesture pattern.

19. The apparatus of any one of clauses 1-18, further including a microphone system including at least one microphone, where the custom event includes microphone data received from the microphone system indicating a custom event sound pattern.

20. The apparatus of clause 19, where the display is configured to present icon configurations on the display associated with voice commands received via the microphone system.

21. The apparatus of any one of clauses 1-20, where the display receives, prior to the custom event, an indication that a single-handed operational mode has been enabled.

22. The apparatus of clause 21, where the display is configured to provide a graphical user interface for enabling and disabling the single-handed operational mode.

23. The apparatus of clause 21, further including a control system, where the control system is configured to disable the single-handed operational mode when the control system is executing at least one type of software application.

24. The apparatus of any one of clauses 1-23, where a first icon spacing of the first configuration is equal to a second icon spacing of the second configuration.

25. The apparatus of any one of clauses 1-24, further including an inertial sensor system, where the inertial sensor data from the inertial sensor system indicates an apparatus orientation.

26. The apparatus of any one of clauses 1-25, further including a fingerprint sensor system, where the custom event includes fingerprint sensor data received from the fingerprint sensor system indicating a custom event touch pattern or a custom event gesture pattern.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium, such as a non-transitory medium. The processes of a method or algorithm disclosed herein may be implemented in a processor-executable software module which may reside on a computer-readable medium. Computer-readable media include both computer storage media and communication media including any medium that may be enabled to transfer a computer program from one place to another. Storage media may be any available media that may be accessed by a computer. By way of example, and not limitation, non-transitory media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those having ordinary skill in the art, and the generic principles defined herein may be applied to other implementations without departing from the spirit or scope of this disclosure. Thus, the disclosure is not intended to be limited to the implementations presented herein, but is to be accorded the widest scope consistent with the claims, the principles and the novel features disclosed herein. The word "exemplary" is used exclusively herein, if at all, to mean "serving as an example, instance, or illustration." Any implementation described herein as "exemplary" is not necessarily to be construed as preferred or advantageous over other implementations.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order presented or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, other implementations are within the scope of the following claims. In some cases, the actions recited in the claims may be performed in a different order and still achieve desirable results.

It will be understood that unless features in any of the particular described implementations are expressly identified as incompatible with one another or the surrounding context implies that they are mutually exclusive and not readily combinable in a complementary or supportive sense, the totality of this disclosure contemplates and envisions that specific features of those complementary implementations may be selectively combined to provide one or more comprehensive, but slightly different, technical solutions. It will therefore be further appreciated that the above description has been given by way of example only and that modifications in detail may be made within the scope of this disclosure.

What is claimed is:

1. An apparatus, comprising:
    a display configured to:
        present, while the apparatus is in a first apparatus orientation, a plurality of icons in a first configuration on the display, the first configuration corresponding to a first icon arrangement; and
        present, associated with a custom event corresponding to a single-handed operational mode, the plurality of icons in a second configuration on the display while the apparatus remains substantially in the first apparatus orientation, the second configuration corresponding to a second icon arrangement, wherein a first position of at least one icon in the first configuration is different from a second position of the at least one icon in the second configuration;
    a fingerprint sensor system, wherein the custom event comprises fingerprint sensor data received from the fingerprint sensor system corresponding with movement of a target object; and
    a control system configured to disable the single-handed operational mode associated with obtaining an indication that the control system is executing at least one type of software application, the indication not being associated with received user input indicating that the single-handed operational mode should be disabled.

2. The apparatus of claim 1, wherein the at least one icon is displayed in a first half of the display in the first configuration and wherein the at least one icon is displayed in a second half of the display in the second configuration.

3. The apparatus of claim 1, wherein a row of icons including the at least one icon is displayed in the first half of the display in the first configuration and wherein the row of icons is displayed in the second half of the display in the second configuration.

4. The apparatus of claim 3, wherein the row of icons is displayed closer to a first side of the display than to a second side of the display in the first configuration and wherein the row of icons is displayed closer to the second side of the display than to the first side of the display in the second configuration, the second side being a side opposite the first side.

5. The apparatus of claim 1, further comprising a touch sensor system proximate the display.

6. The apparatus of claim 1, wherein the custom event further comprises fingerprint sensor data received from the fingerprint sensor system indicating a custom event touch pattern.

7. The apparatus of claim 5, further comprising a control system, wherein each icon of the plurality of icons corresponds with a software application of a plurality of software applications that the control system is configured to initialize in association with receiving an icon touch indication from the touch sensor system, the icon touch indication corresponding to a touch in an icon position.

8. The apparatus of claim 7, wherein the control system is configured to implement a transform estimator module for controlling changes of touch sensor system operations corresponding with changes in icon configurations.

9. The apparatus of claim 1, wherein the custom event comprises fingerprint sensor data received from the fingerprint sensor system indicating a custom event gesture pattern.

10. The apparatus of claim 1, further comprising a microphone system including at least one microphone, wherein the display is configured to present icon configurations on the display associated with voice commands received via the microphone system.

11. The apparatus of claim 1, wherein the display receives, prior to the custom event, an indication that a single-handed operational mode has been enabled.

12. The apparatus of claim 11, wherein the display is configured to provide a graphical user interface for enabling and disabling the single-handed operational mode.

13. The apparatus of claim 1, wherein a first icon spacing of the first configuration is equal to a second icon spacing of the second configuration.

14. The apparatus of claim 1, further comprising an inertial sensor system, wherein the inertial sensor data from the inertial sensor system indicates an apparatus orientation.

15. The apparatus of claim 1, wherein the fingerprint sensor system comprises an ultrasonic fingerprint sensor system.

16. The apparatus of claim 1, wherein the control system is configured to disable the single-handed operational according to the type of software application being executed.

17. A method, comprising:
    presenting, while an apparatus is in a first apparatus orientation, a plurality of icons in a first configuration on a display of the apparatus, the first configuration corresponding to a first icon arrangement;
    presenting, associated with a custom event corresponding to a single-handed operational mode, the plurality of icons in a second configuration on the display while the apparatus remains substantially in the first apparatus orientation, the second configuration corresponding to a second icon arrangement, wherein a first position of at least one icon in the first configuration is different from a second position of the at least one icon in the second configuration and wherein the custom event comprises fingerprint sensor data received from a fingerprint sensor system corresponding with movement of a target object; and
    disabling the single-handed operational mode associated with obtaining an indication that at least one type of software application is being executed on the apparatus, the indication not being associated with received user input indicating that the single-handed operational mode should be disabled.

18. The method of claim 17, wherein the at least one icon is displayed in a first half of the display in the first configuration and wherein the at least one icon is displayed in a second half of the display in the second configuration.

19. The method of claim 17, wherein a row of icons including the at least one icon is displayed in the first half of the display in the first configuration and wherein the row of icons is displayed in the second half of the display in the second configuration.

20. The method of claim 19, wherein the row of icons is displayed closer to a first side of the display than to a second side of the display in the first configuration and wherein the row of icons is displayed closer to the second side of the display than to the first side of the display in the second configuration, the second side being a side opposite the first side.

21. One or more non-transitory media having instructions for controlling one or more devices to perform a method encoded thereon, the method comprising:
  presenting, while an apparatus is in a first apparatus orientation, a plurality of icons in a first configuration on a display of the apparatus, the first configuration corresponding to a first icon arrangement;
  presenting, associated with a custom event corresponding to a single-handed operational mode, the plurality of icons in a second configuration on the display while the apparatus remains substantially in the first apparatus orientation, the second configuration corresponding to a second icon arrangement, wherein a first position of at least one icon in the first configuration is different from a second position of the at least one icon in the second configuration and wherein the custom event comprises fingerprint sensor data received from a fingerprint sensor system corresponding with movement of a target object; and
  disabling the single-handed operational mode associated with obtaining an indication that at least one type of software application is being executed on the apparatus, the indication not being associated with received user input indicating that the single-handed operational mode should be disabled.

22. The one or more non-transitory media of claim 21, wherein the at least one icon is displayed in a first half of the display in the first configuration and wherein the at least one icon is displayed in a second half of the display in the second configuration.

23. The one or more non-transitory media of claim 21, wherein a row of icons including the at least one icon is displayed in the first half of the display in the first configuration and wherein the row of icons is displayed in the second half of the display in the second configuration.

24. The one or more non-transitory media of claim 23, wherein the row of icons is displayed closer to a first side of the display than to a second side of the display in the first configuration and wherein the row of icons is displayed closer to the second side of the display than to the first side of the display in the second configuration, the second side being a side opposite the first side.

25. An apparatus, comprising:
  display means;
  fingerprint sensor means; and
  control means for:
    presenting, while an apparatus is in a first apparatus orientation, a plurality of icons in a first configuration on the display means, the first configuration corresponding to a first icon arrangement;
  presenting, associated with a custom event corresponding to a single-handed operational mode, the plurality of icons in a second configuration on the display while the apparatus remains substantially in the first apparatus orientation, the second configuration corresponding to a second icon arrangement, wherein a first position of at least one icon in the first configuration is different from a second position of the at least one icon in the second configuration and wherein the custom event comprises fingerprint sensor data received from a fingerprint sensor system corresponding with movement of a target object; and
  disabling the single-handed operational mode associated with obtaining an indication that at least one type of software application is being executed on the apparatus, the indication not being associated with received user input indicating that the single-handed operational mode should be disabled.

26. The apparatus of claim 25, wherein the at least one icon is displayed in a first half of the display means in the first configuration and wherein the at least one icon is displayed in a second half of the display means in the second configuration.

27. The apparatus of claim 25, wherein a row of icons including the at least one icon is displayed in the first half of the display means in the first configuration and wherein the row of icons is displayed in the second half of the display means in the second configuration.

* * * * *